United States Patent
Djordjevic et al.

(10) Patent No.: US 11,206,553 B2
(45) Date of Patent: *Dec. 21, 2021

(54) PROVISION OF COVERAGE FOR A WIRELESS COMMUNICATION NETWORK BY USING MOVING BASE STATIONS ON ROBOTS OR DRONES

(71) Applicant: Telefonaktiebolaget LM Ericsson (publ), Stockholm (SE)

(72) Inventors: Branko Djordjevic, Herzogenrath (DE); Torsten Dudda, Aachen (DE); Wojciech Potentas, Lódz (PL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

This patent is subject to a terminal disclaimer.

(21) Appl. No.: 16/822,779

(22) Filed: Mar. 18, 2020

(65) Prior Publication Data

US 2020/0221318 A1    Jul. 9, 2020

Related U.S. Application Data

(63) Continuation of application No. 15/955,750, filed on Apr. 18, 2018, now Pat. No. 10,631,175, which is a
(Continued)

(51) Int. Cl.
*H04W 16/26* (2009.01)
*H04W 24/02* (2009.01)
(Continued)

(52) U.S. Cl.
CPC .......... *H04W 16/26* (2013.01); *B64C 39/024* (2013.01); *G08G 1/202* (2013.01); *G08G 5/0043* (2013.01);
(Continued)

(58) Field of Classification Search
CPC ..... H04W 16/24; H04W 16/26; H04W 16/30; H04W 16/32; H04W 24/02; B64C 39/024;
(Continued)

(56) References Cited

U.S. PATENT DOCUMENTS 8,116,763 B1 *   2/2012   Olsen ................. H04W 16/28
                                                          455/431
2003/0124977 A1 * 7/2003  Smith ................. H04W 88/04
                                                          455/16
(Continued)

FOREIGN PATENT DOCUMENTS

WO      2013030834 A1    3/2013
WO      2014011316 A1    1/2014

*Primary Examiner* — Aaron L Troost
(74) *Attorney, Agent, or Firm* — Coats & Bennett, PLLC

(57) ABSTRACT

A maintenance base controls a plurality of mobile robots providing a radio coverage area. The maintenance base instructs a mobile robot of the plurality of mobile robots to maintain a formation with the other mobile robots in the plurality of mobile robots such that the radio coverage area is provided, and instructs the mobile robot to rotate positions within the formation to maintain the radio coverage area as a further mobile robot in the formation leaves the formation and another mobile robot enters the formation. The mobile robot acts in accordance with the instructions of the maintenance base.

31 Claims, 8 Drawing Sheets

Related U.S. Application Data continuation of application No. 15/244,426, filed as application No. PCT/EP2014/055394 on Mar. 18, 2014, now Pat. No. 10,015,678.

(51) Int. Cl.
*H04W 16/32* (2009.01)
*H04B 7/185* (2006.01)
*B64C 39/02* (2006.01)
*G08G 1/00* (2006.01)
*G08G 5/00* (2006.01)
*H04W 88/08* (2009.01)

(52) U.S. Cl.
CPC ....... *G08G 5/0069* (2013.01); *H04B 7/18504* (2013.01); *H04W 16/32* (2013.01); *H04W 24/02* (2013.01); *B64C 2201/122* (2013.01); *B64C 2201/141* (2013.01); *H04W 88/08* (2013.01)

(58) Field of Classification Search
CPC ........ B64C 2201/122; B64C 2201/141; G08G 1/202; G08G 5/0043; G08G 5/0069
See application file for complete search history.

(56) References Cited

U.S. PATENT DOCUMENTS

| | | | |
|---|---|---|---|
| 2011/0118907 A1* | 5/2011 | Elkins | B64B 1/00 701/3 |
| 2013/0303218 A1* | 11/2013 | Teller | H04W 16/04 455/507 |
| 2014/0057626 A1 | 2/2014 | Uelk et al. | |
| 2016/0226573 A1* | 8/2016 | Behroozi | H04B 7/18506 |

* cited by examiner

PROVISION OF COVERAGE FOR A WIRELESS COMMUNICATION NETWORK BY USING MOVING BASE STATIONS ON ROBOTS OR DRONES

RELATED APPLICATIONS

This application is a continuation of prior U.S. patent application Ser. No. 15/955,750, filed 18 Apr. 2018, which is a continuation of U.S. patent application Ser. No. 15/124,426, filed 8 Sep. 2016, issued as U.S. patent Ser. No. 10/015,678 on 3 Jul. 2018, which was the National Stage of International Application No. PCT/EP2014/055394, filed 18 Mar. 2014, the disclosures of each of which are incorporated by reference herein in their entireties.

TECHNICAL FIELD

The present invention relates to telecommunications, and in particular to methods, apparatuses, and computer programs for providing coverage of a wireless communication network.

BACKGROUND

Unmanned aircraft vessel, unmanned land vehicle, and unmanned marine vessel are types of vehicles that move autonomously without human pilot, either autonomously on a pre-programmed path or steered from remote. These vehicles could operate respectively in the air, on the land, on sea, or on inland water. The vehicles typically have an own engine respectively jet, propeller, wheel, crawler, propeller screw, or hover propulsion and gear. These are vehicles are known under the generic term mobile robots.

The increasing capabilities, high movability and the recently decreasing price of mobile robots suggest utilizing mobile robots also in new deployment areas, for example in wireless communication networks.

There are situations when the need for network capacity grows rapidly and it is urgent to create more and/or remote network coverage in an ad-hoc fashion. This could be caused by a movement of people like evacuation, road jam, or huge public events. Today there is a need to install base stations or wireless access points at these places and connect them with the wireless communication network. This is however sometimes impossible due to character of the terrain or area property, or simply because the network coverage or network capacity demands change too fast or unexpected.

A utilization of mobile robots in mobile communication networks promises several benefits such as quick deployment, quick withdrawal, and high coverage flexibility. In order to achieve these benefits appropriate methods and devices are needed that enable provisioning of coverage of a wireless communication network with the help of mobile robots and ways to maintain the achieved coverage also in cases that mobile robots fail unexpectedly or have to be periodically recharged/refueled.

SUMMARY

There is a clear need for providing coverage of a wireless communication network with mobile robots. This is solved by mounting radio base stations on mobile robots. There is also need to maintain the provisioned coverage even when deployed mobile robots have to be replaced. The need to replace a mobile robot may arise due to sudden failure of a mobile robot or due to foreseeable maintenance needs such as refueling or recharging.

It is an object of the present invention to provide coverage of a wireless communication network with the help of radio base stations mounted on mobile robots. This object is achieved by the independent claims. Advantageous embodiments are described in the dependent claims.

According to an exemplary aspect of the invention, a method for providing coverage of a wireless communication network is provided. The wireless communication network comprises radio base stations mounted on mobile robots and the mobile robots are capable of communicating with a maintenance base. The method comprises to determine a radio coverage area to be provided by the radio base stations mounted on said mobile robots. The method further comprises to deploy said mobile robots at geographical positions suitable to provide the radio coverage area; and to replace, by the maintenance base, a deployed mobile robot in order to maintain the radio coverage area.

The method may further comprise that replacing a deployed mobile robot comprises to instruct the deployed mobile robot to be replaced to return to the maintenance base; and to deploy a further mobile robot to a vacant geographical position.

The method may further comprise to re-arrange the deployment of the mobile robots to geographical positions.

According to another exemplary aspect of the invention a method of operating a mobile robot is provided. The mobile robot comprises a radio base station of a wireless communication network and the mobile robot is capable of communicating with a maintenance base. The method comprises to take up a geographical position on instruction. The method further comprises to provide a radio coverage area or sub-area at the geographical position. The method further comprises to move, on instruction, to a further geographical position while continuing to provide the radio coverage area or sub-area and to return, on instruction, to the maintenance base.

The method may further comprise to determine a condition that a return to the maintenance base is required and to initiate handing over handling of calls and/or packet sessions ongoing in the base station of the mobile robot to a further mobile robot.

The method may further comprise to determine a condition that a return to the maintenance base is required, comprising of determining an operational status, determining the operational status to be critical, sending a status report to the maintenance base comprising the operational status; and receiving an instruction from the maintenance base to return to the maintenance base.

According to another exemplary aspect of the invention a method of operating a maintenance base for providing coverage of a wireless communication network is provided. The wireless communication network comprises radio base stations mounted on mobile robots and the mobile robots are capable of communicating with the maintenance base. The method comprises to determine geographical positions for the mobile robots. The method further comprises to deploy said mobile robots at the determined geographical positions by instructing them to take up their determined geographical positions, and to replace a deployed mobile robot.

The method may further comprise that replacing a deployed mobile robot comprises to instruct the deployed mobile robot to be replaced to return to the maintenance base and to deploy a further mobile robot to a vacant geographical position.

The method may further comprise to re-arrange the deployment of the mobile robots to geographical positions.

According to another exemplary aspect of the invention a mobile robot is provided comprising a radio base station of a wireless communication network. The mobile robot is capable of communicating with a maintenance base. The mobile robot is capable of an instruction taking up a geographical position. The mobile robot is further capable of providing a radio coverage area or sub-area at the geographical position. The mobile robot is further capable of, to move to a further geographical position on instruction while continuing to provide the radio coverage area or sub-area and to return, on instruction, to the maintenance base.

According to another exemplary aspect of the invention a maintenance base for providing coverage of a wireless communication network is provided. The wireless communication network comprises radio base stations mounted on mobile robots and the mobile robots are capable of communicating with the maintenance base. The maintenance base is capable of determining geographical positions for the mobile robots. The maintenance base is further capable of deploying said mobile robots at the determined geographical positions by instructing them to take up their determined geographical positions; and to replace a deployed mobile robot.

According to another exemplary aspect of the invention a system for providing coverage of a wireless communication network is provided. The wireless communication network comprises radio base stations mounted on mobile robots and the mobile robots are capable of communicating with a maintenance base. The system comprises a plurality of mobile robots, at least one maintenance base, and at least one user equipment.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
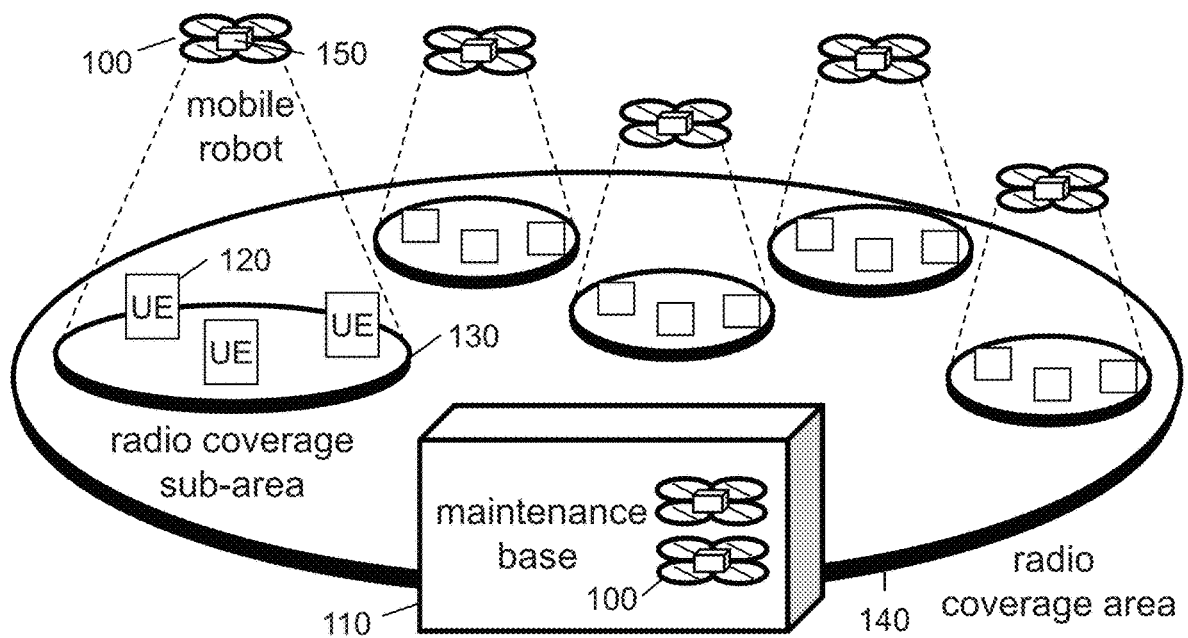
FIG. 1 shows a diagram illustrating a system for providing coverage of a wireless communication network according to the invention.

In the following, methods, apparatuses, and computer programs for providing coverage of a wireless communication network according to the invention are described in more detail.

Within the context of the present application, the term "mobile robot" refers to an automatic machine that is capable of moving in any given environment. Mobile robots have the capability to move around in their environment and are not fixed to one physical location. In contrast, industrial robots usually consist of a jointed arm (multi-linked manipulator) and gripper assembly (or end effector) that is attached to a fixed surface. Mobile robots may be classified by the environment in which they move:

Land or home robots are usually referred to as Unmanned Ground Vehicles. They are most commonly wheeled or tracked, but also include legged robots with two or more legs (humanoid or resembling animals or insects).

Aerial robots are usually referred to as Unmanned Aerial Vehicles.

Underwater robots are usually called Autonomous Underwater Vehicles or Unmanned Submarine Vessel.

Water surface based mobile robots are usually referred to as Unmanned Marine Vehicles.

The above listed vehicles are the types of vehicles that move autonomously without human pilot on a programmed or instructed path or towards an instructed geographical position, or may also be steered and controlled remotely. These vehicles could operate respectively in the air, on land, underground, on sea and inland waters, in space or even on other planets/asteroids. The vehicles have an own engine respectively jet, propeller, wheel, crawler track, propeller screw, or hover propulsion and gear. The vehicles have the ability of sending data to each other and/or to a controlling base wirelessly.

Within the context of the present application, the term "daisy chain" refers to an association scheme, used for example in electrical and electronic engineering in which multiple objects are associated together in a sequence or in a ring. The daisy chain within the context of the present application forms a ring topology, i.e. there is a loop connection back from the last device to the first. For example the sequence of A-B-C-D-E and then back to -A (loop), wherein A-E are the sequenced objects. This is here referred to as a "daisy chain loop".

Within the context of the present application, the term "geographical position" refers to a fixed geographical location or a trajectory path between two geographical locations.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "wireless communication network" may particularly denote a collection of nodes or entities, related transport links, and associated management needed for running a service, for example a wireless telephony service or a wireless packet transport service. Depending on the service, different node types or entities may be utilized to realize the service. A network operator owns the wireless communication network and offers the implemented services to its subscribers. Typical examples of a wireless communication network are radio access network (such as 2G, GSM, 3G, WCDMA, CDMA, LTE, WLAN, Wi-Fi), mobile backhaul network, or core network such as IMS, CS Core, PS Core.

Within the context of the present application, the term radio base station refers to a node of a radio access network that is used as interface between land-based transport links and radio based transport links, wherein the radio based transport link interfaces directly a user equipment. For example, in a GSM/2G access network a radio base station refers to a BTS, in a WCDMA/3G access network a radio base station refers to a NodeB, and in a LTE access network a radio base station refers to a eNodeB. In a WLAN/Wi-Fi architecture a radio base station refers to an Access Point (AP).

Referring to FIG. 1, this figure shows a diagram illustrating a system for providing coverage of a wireless communication network according to the invention.

In this embodiment a targeted radio coverage area 140 is realized by a plurality of radio coverage sub-areas 130. The radio coverage sub-areas 130 are provided by radio base stations 150 mounted on mobile robots 100. In this embodiment the mobile robots 100 are unmanned aerial vehicles, also known as drones. A plurality of user equipment 120 are roaming in the radio coverage area 140 and are radio attached to the radio coverage sub-areas 130 provided by radio base stations 150 mounted on mobile robots 100. Furthermore, there is a maintenance base 110 located within the radio coverage area 140 or located close to it. The maintenance base 110 comprises a plurality of mobile robots 100 for initial deployment or as spare mobile robots 100 for deployment in case of failure of one of the deployed mobile robots 100.

In an alternative embodiment there may be more than one maintenance base 110 being allocated to the radio coverage area 140. This may be the case if the radio coverage area 140 is very large and the mobile robots 100 would have to travel long distances to their deployment position. Also for redundancy purposes it would be beneficial to use a more than one maintenance base 110. If for example the radio coverage area 140 would cover an earthquake disaster area, then due to the possibility of further earthquakes in the same area a further maintenance base 110 could act as stand-in in case of damages to the first maintenance base 110.

It may also be possible that a single maintenance base 110 could serve more than one radio coverage area 140. For example it the radio coverage areas 140 are small but located close to each other, a single maintenance base 110 could be placed in equal distance to both radio coverage areas 140 and the single maintenance base 110 could serve both radio coverage areas 140.

A maintenance base 110 also comprises equipment needed to perform maintenance or repair tasks on mobile robots 100. A regular maintenance task would be to recharge or refuel mobile robots 100, so the maintenance base 110 could comprise fuel storage and/or electricity grid connections. Mobile robots 100 consume energy when moving from one position to a further position. In the example of drones, energy is consumed even if without movement. Energy would be needed for hovering at a given position at a constant altitude. On the other hand, drones may also land on exposed positions for providing their radio coverage sub-area 130, and by this reducing the energy consumption. However, energy would still be needed for powering the mounted radio base station 150 and for powering other electric parts needed for operation such as transceiver, handover controller, positioning unit, or operation status determination unit (see FIG. 12). The maintenance base 110 could in addition comprise spare parts needed for repairing failed mobile robots 100.

The maintenance base 110 may operate stand-alone or may be connected to or associated with for example an operation and maintenance center of the wireless communication network. In this case the maintenance base 110 may receive input from the wireless communication network on the targeted radio coverage area 140, so for example a coverage range, a coverage shape, or a capacity demand at specific geographical positions. The maintenance base 110 may also report back to the wireless communication network on the status of the provided radio coverage area 140.

The mobile robots 100 may be capable of communicating with the maintenance base 110. This communication link may be bidirectional and is used to transmit instructions from the maintenance base 110 to the mobile robots 100. The other direction may be used by the mobile robots 100 to report their operational status to the maintenance base 110. The maintenance base 110 may also use the communication link to perform triangulation and by that determine or verify the geographical position 200 of the mobile robots 100.

This communicating may be achieved via a direct radio or optical link from each mobile robot 100 to the maintenance base 110 with the help of directed/rotatable radio antenna, laser (using different colors, or infrared) or maser. The communication may also be routed via one or several satellite hops (geostationary or low orbit satellites), or via other land based hops to the maintenance base 110. The communication may also be forwarded through one or several other mobile robots 100 functioning as relay points for the communication. One or several mobile robots 100 may hover at a higher altitude and operate as central relay hop for the entire communication towards the maintenance base 110. Depending on the type of ground, such relay point mobile robots 100 may also operate at a lower altitude, for example in narrow valleys in mountain areas, or in urban corridors of streets or rail tracks. Bad weather conditions may also force to choose a lower altitude for relay point mobile robots 100.

The radio base stations 150 are mounted on mobile robots 100, so each mobile robot 100 may carry one radio base station 150. By alternative, there may be more than one radio base station 150 per mobile robot 100, or there may be specialized mobile robots without radio base station acting as communication hub only. The radio base stations 150 are connected to the access network of the wireless communication network. This connection may be realized via the communication link of the mobile robots 100 to the maintenance base 110, or may also utilize a separate radio link or optical link. So the wireless communication network does not see any differences whether a radio base station 150 is mounted on a mobile robot 100 or a radio base station is land-based.

In an alternative embodiment a mobile robot 100 may carry more equipment of the wireless communication network than just a radio base station 150. A mobile robot 100 may be adapted to comprise in addition or alternatively to the radio base station 150 also at least one of the following wireless communication network elements: Serving GPRS Support Node (SGSN), Mobility Management Entity (MME), Gateway GPRS Support Node (GGSN), Mobile Switching Center (MSC), Gateway MSC (GMSC), Media Gateway (MGW), and Radio Access Network Controller. Hosting these additional wireless communication network elements may allow calls and/or packet sessions between two user equipments 120 in the same area covered by one mobile robot 100 to be handled locally within the mobile robot 100 and by this minimizing any interaction with other land-based elements of the wireless communication network.

FIG. 1 shows a static scenario when mobile robots 100 have been deployed and the targeted radio coverage area 140 has been established. In order to reach this state, mobile robots 100 need to be initially deployed, mobile robots 100 need to be replaced for maintenance purposes, and unexpectedly failing mobile robots 100 have to be replaced in an efficient way, minimizing effects on the provisioning of the radio coverage area 140. In addition, it may be necessary to stop the provisioning of the radio coverage area 140, when the need for the radio coverage area 140 has ceased. These steps are explained with the help of the following figures.

Figure 2:
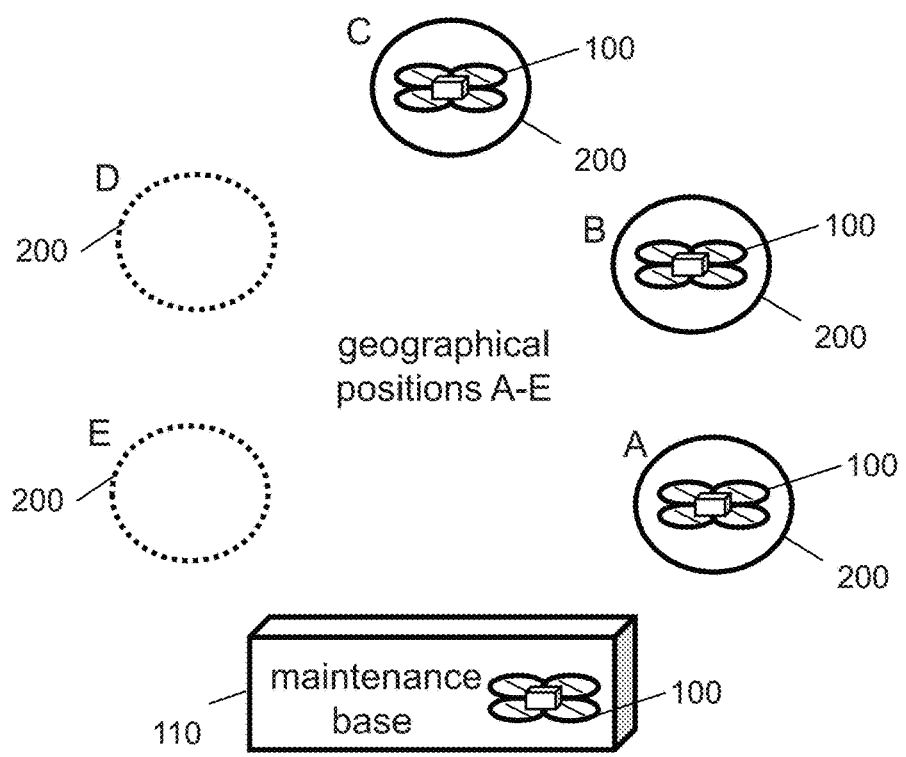
FIG. 2 shows an illustration of mobile robots taking up geographical positions from the maintenance base, according to the invention.

Referring to FIG. 2, this figure shows an illustration of mobile robots taking up geographical positions from the maintenance base, according to the invention.

The figure shows details of the initial deployment of mobile robots 100. In a first step the radio coverage area 140 to be provided by the radio base stations 150 mounted on said mobile robots 100 has to be determined. The maintenance base 110 may determine the targeted radio coverage area 140 on its own (corresponding data may have been provided to the maintenance base 110 directly), or receive this data as input from for example an operation and maintenance center of the wireless communication network. Input data may be the range of the radio coverage area 140, the shape and the capacity demands at certain locations.

After the targeted radio coverage area 140 has been determined, the maintenance base 110 determines geographical positions 200 for the mobile robots 100. These geographical positions 200 are determined in a way that they are suitable to provide the targeted radio coverage area 140. A mobile robot 100 deployed at a geographical position 200 provides with the help of its mounted radio base station 150 a radio coverage sub-area 130, and the plurality of radio coverage sub-area 130 make up the targeted radio coverage area 140. So the geographical positions 200 are determined to meet the input data coverage range, coverage shape, and capacity. The radio coverage sub-areas 130 may overlap with each other, may form a seamless coverage area, or may leave uncovered areas in-between them.

The maintenance base 110 then deploys mobile robots 100 at the determined geographical positions 200 by instructing them to take up their determined geographical positions 200.

A mobile robot 100 located at or in the maintenance base 110 receiving such instruction then moves to the instructed geographical positions 200.

The figure shows a scenario where five geographical positions 200 labeled A to E have been determined. Three of these five geographical positions 200, positions A, B, and C have been deployed already with mobile robots 100. The remaining two geographical positions 200 D and E are still vacant and need to be deployed with further mobile robots 100. So as a next step the maintenance base 110 instructs one further mobile robot 100 to take up the geographical position D, and then another mobile robot 100 to take up the geographical position E. After that all geographical positions 200 are deployed with mobile robots 100.

The mobile robots 100 may be instructed by the maintenance base 110 to take up their geographical positions 200 by moving straight from the maintenance base 110 to their determined geographical positions 200. The mobile robots 100 may be also be instructed by the maintenance base 110 to follow a given path for deployment.

Figure 3:
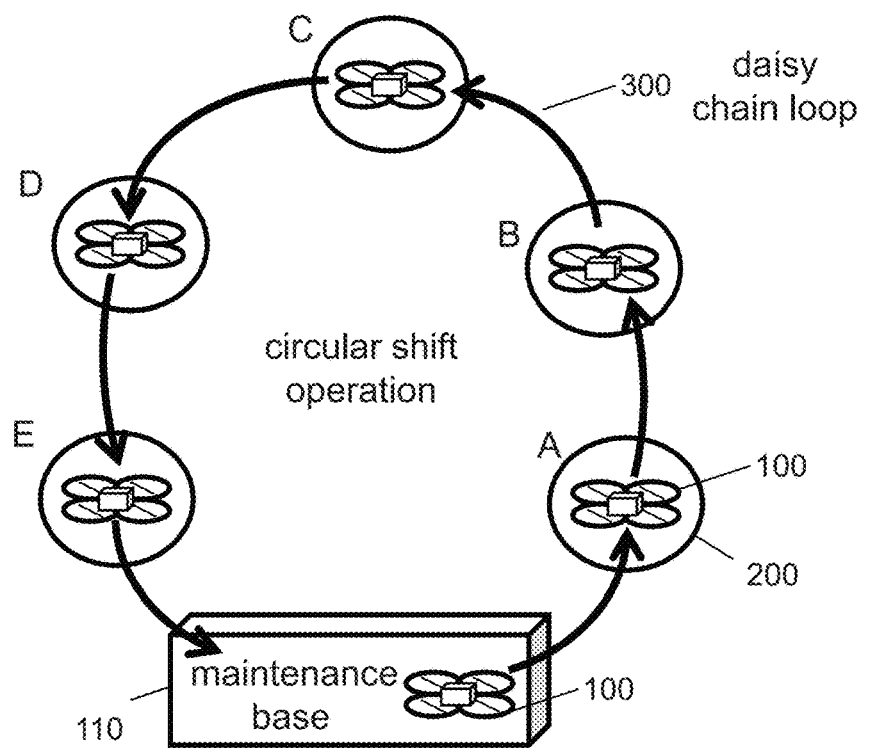
FIG. 3 shows an illustration of a daisy chain loop of deployed mobile robots, and a circular shift operation, according to the invention.

Referring to FIG. 3, this figure shows an illustration of a daisy chain loop of deployed mobile robots, and a circular shift operation, according to the invention.

At this point all geographical positions 200 have been deployed with mobile robots 100. The next step is to prepare the replacement of a deployed mobile robot 100 in order to maintain the radio coverage area 140. The deployed mobile robots 100 consume energy and need to be recharged/refuel at periodic intervals. Also other periodic maintenance tasks need to be performed on the mobile robots 100 in order to ensure smooth operation. For this purpose a plan is needed to move all deployed mobile robots 100 back to the maintenance base 110 after a certain period of operation.

In this embodiment the solution is to instruct a deployed mobile robot 100 to be replaced to return to the maintenance base 110 and to deploy a further mobile robot 100 to a vacant geographical position 200. After the deployed mobile robot 100 to be replaced has left his geographical position 200, a new mobile robot 100 may be instructed to take up this vacant geographical position 200. So for example in the figure the mobile robot 100 on geographical position 200 C returns to the maintenance base 110 and the maintenance base 110 instructs a further mobile robot 100 to move from the maintenance base 110 to the vacant geographical position 200 C.

By alternative, the maintenance base 110 may re-arrange the deployment of mobile robots 100 to geographical positions 200 before instructing a further mobile robot 100 to start from the maintenance base 110. For this re-arrangement the maintenance base 110 instruct one or several deployed mobile robot 100 to move from their current geographical position 200 to a vacant geographical position 200 and by this re-arrange the deployment of mobile robots 100 to geographical positions 200. After the re-arrangement still one vacant geographical position 200 remains which is then filled on instruction by the maintenance base 110 with a newly deployed mobile robot 100. After that all geographical positions 200 are filled again with mobile robots 100 and the radio coverage area 140 is maintained.

In this embodiment the re-arranging the deployment of mobile robots 100 to geographical positions 200 is done in a structured way. For this a daisy chain loop 300 of deployed mobile robots 100 is determined, wherein the maintenance base 110 is allocated to the daisy chain loop 300 as an entry/exit element.

The figure shows an example of a determined daisy chain loop 300 consisting of mobile robots 100 deployed at the geographical positions 200 A to E and the maintenance base 110. The determination of the daisy chain loop 300 and the allocation of mobile robots 100 to the daisy chain loop 300 may be performed by the maintenance base 110.

The above described step of re-arranging the deployment of mobile robots 100 to geographical positions 200 is done by utilizing the ring structure of the daisy chain loop 300. The mobile robots 100 of the daisy chain loop 300 perform a circular shift operation within the daisy chain loop 300, wherein the last mobile robot 100 of the daisy chain loop 300 is returning to the maintenance base 110, and a further mobile robot 100 is deployed to a vacant first position of the daisy chain loop 300.

This circular shift operation within the daisy chain loop 300 is shown in the figure. So the mobile robot 100 deployed at geographical position 200 E is instructed to move back to the maintenance base 110. The now vacant geographical position 200 E is then filled by instructing the mobile robot 100 deployed at geographical position 200 D to move to the geographical position 200 E and by this leaving geographical position 200 D vacant. This shift operation is continued along the daisy chain loop 300 until geographical position 200 A is left vacant. This vacant geographical position 200 A is then filled with a new mobile robot 100 from the maintenance base 110.

So the circular shift operation within the daisy chain loop 300 makes the mobile robots 100 allocated to the daisy chain loop 300 to move around the loop and by that achieve a re-arranging the deployment of mobile robots 100 to geographical positions 200. At the same time the mobile robot 100 of the geographical position 200 A is replaced by a new mobile robot 100 from the maintenance base 110 entering the daisy chain loop 300 at geographical position 200 A. A mobile robot 100 returning to the maintenance base 110 will then be for example recharged/refueled and can then at the next circular shift operation within the daisy chain loop 300 be fed again into the daisy chain loop 300 at position A.

The circular shape of the daisy chain loop 300 in the figure is to be seen as a logical abstraction of a real shape of the daisy chain loop 300. The real shape may depend for example on geographical obstacles that need to be avoided when moving from one geographical position 200 to the next geographical position 200 of the daisy chain loop 300. The mobile robots 100 may also move along a shortest path between geographical positions 200 of the daisy chain loop 300, causing a real daisy chain loop 300 to have a non-circular shape.

The daisy chain loop 300 may also be utilized at initial deployment of mobile robots 100. In this case the determination of the daisy chain loop 300 is done before the initial deployment is initiated. Mobile robots 100 may be instructed by the maintenance base 110 to take up their geographical positions 200 by moving along a path of the daisy chain loop 300 starting from the maintenance base 110.

The mobile robots 100 may take up the geographical position 200 and/or may return to the maintenance base 110 by moving along a given path. The maintenance base 110 may instruct this path to the mobile robots 100.

The structured re-arranging the deployment of the mobile robots 100 to geographical positions 200 along the daisy chain loop 300 allows a mobile robot 100 to return to the maintenance base 110 at periodic intervals for maintenance. The time a mobile robot 100 can operate may depend on several factors. This embodiment takes those factors into account when determining the number of daisy chain loop 300 elements. So in the figure the daisy chain loop 300 consists of five elements.

The number of daisy chain loop 300 elements may be determined by taking movability of the mobile robots 100 into account. Movability of the mobile robots 100 may be related to at least one of, a moving speed, a reaching range, a regular maintenance interval and a recharging/refueling interval. The number of daisy chain loop 300 elements may also be related to at least one of: a size of the radio coverage area 140 generated by the radio base stations 150 mounted on mobile robots 100, a shape of the coverage area of the wireless communication network, a capacity of the coverage area of the wireless communication network, and a maximum payload of the mobile robots 100.

In addition to the number of daisy chain loop 300 elements, a further criterion for the time until a deployed mobile robot 100 returns to the maintenance base 110 may be at what intervals the circular shift operation is triggered. If the circular shift operation is periodically triggered after short intervals the mobile robots 100 will return sooner to the maintenance base 110. So by adjusting the trigger interval of the circular shift operation a timely return of the mobile robots 100 to the maintenance base 110 can be achieved.

The circular shift operation within the daisy chain loop 300 may be triggered in periodic intervals by the maintenance base 110. The periodic interval may be determined such that the mobile robots 100 of the daisy chain loop 300 are shifted to the maintenance base 110 by circular shift operations before reaching a critical operational status. A critical operational status may be reached if a mobile robot 100 runs out of energy or if the mobile robot 100 requires periodic maintenance.

The circular shift operation may be performed clock-wise or counter clock-wise and may be decided by the maintenance base 110.

In addition or by alternative the circular shift operation within the daisy chain loop 300 may be triggered by one of the mobile robots 100 of the daisy chain loop 300. A mobile robot 100 of the daisy chain loop 300 may detect that a return to the maintenance base 110 is needed earlier than originally planned or calculated at departure from the maintenance base 110. The reason for that may for example be that moving across the terrain required more energy than anticipated at departure from the maintenance base 110. In this case the mobile robot 100 may inform the maintenance base 110 and the maintenance base 110 may instruct an additional circular shift operation or shorten the time interval between the circular shift operations and by that ensuring that the mobile robot 100 returns to the maintenance base 110 before a critical operation status is reached. By alternative, a mobile robot 100 may trigger the circular shift operation directly by contacting the other mobile robots 100 of the daisy chain loop 300.

In an alternative embodiment the mobile robots 100 may perform the circular shift operation by permanently moving from a current geographical position 200 to a further geographical position 200 of the daisy chain loop 300. By performing a slow movement the mobile robots 100 may lower the energy consumption. This may be the case if for example a mobile robot 100 is not able to hover at a geographical position 200 but has to stay in movement in order to gain uplift. The circular shift operation may then be realized by a permanent slow movement of the mobile robots 100 along the daisy chain loop 300.

When the provisioning of the coverage of the wireless communication network is to be stopped, the maintenance base 110 recalls all deployed mobile robots 100. A mobile robot 100 being instructed to return to the maintenance base 110 may switch off its mounted radio base station and by this closes down the related radio coverage sub-area 130 before moving back to the maintenance base 110. The maintenance base 110 may instruct the mobile robots 100 one by one to return to the maintenance base 110. By alternative, the maintenance base 110 may instruct circular shift operations without feeding in new mobile robots 100 into the daisy chain loop 300 and by that bring all mobile robots 100 back to the maintenance base 110. The maintenance base 110 may also instruct the mobile robots 100 to return to the maintenance base 110 and the mobile robots 100 will by themselves select a return path along the daisy chain loop 300. This controlled shut-down of the radio coverage area 140 avoids jams of returning mobile robots 100 at the maintenance base 110.

The maintenance base 110 may decide to only shut down parts of the radio coverage area 140 and leave the rest operative. The maintenance base 110 may then also change the assignment of deployed mobile robots 100 to daisy chain loops 300.

A user equipment 120 camping in the radio coverage area 140 provided by the radio base stations 150 mounted on the mobile robots 100 does not recognize whether its radio attachment is towards a land based radio base station or a mobile robot 100 mounted radio base station 150. The user equipment 120 selects the strongest radio for attachment.

A user equipment 120 may perform a change of radio attachment when the deployed mobile robots 100 are re-arranged or replaced, if the user equipment 120 is camping in the radio coverage area 140 provided by the radio base stations 150 mounted on the mobile robots 100. When mobile robots 100 move to new geographical positions 200 due to re-arrangement or circular shift operation, they may continue to provide their respective radio coverage sub-area 130. For a user equipment 120 this is visible by a decreasing radio strength of the radio coverage sub-area 130 the UE is attached to, as the respective mobile robot 100 is moving away. At the same time a new mobile robot 100 is approaching which causes the user equipment 120 to detect a new radio coverage sub-area 130 provided by the new approaching mobile robot 100. When reaching a lower radio strength threshold, the user equipment 120 may switch its radio attachment to the radio coverage sub-area 130 provided by the newly approaching mobile robot 100.

For a circuit switched attached user equipment 120 the change of the radio attachment may cause the user equipment 120 to perform a location update procedure. For a packet switched attached user equipment 120 the change of the radio attachment may cause the user equipment 120 to perform a tracking or routing area update procedure.

If a mobile robot 100 has to be replaced all the ongoing calls and/or packet sessions that are currently handled by the radio base station 150 mounted on the mobile robot 100 to be replaced have to be continued, so handed over to a new radio base station 150 mounted on a new mobile robot 100. The maintenance base 110 may send an instruction to a mobile robot 100 for handing over a handling of ongoing calls and/or packet sessions from the mobile robot 100 to a further mobile robot.

A mobile robot 100 may receive an instruction from the maintenance base 110 for handing over the handling of ongoing calls and/or packet sessions. In an alternative embodiment the mobile robot 100 may trigger handing over the handling of ongoing calls and/or packet sessions based on a detected proximity of a further mobile robot 100. In this case the maintenance base 110 may have instructed a new mobile robot 100 to take up the geographical position 200 of the mobile robot 100 to be replaced. When the mobile robot 100 to be replaced detects that a new mobile robot 100 is approaching the own geographical position 200 and comes closer than a lower threshold, the hand-over is triggered.

In an alternative embodiment the handing over the handling of ongoing calls and/or packet sessions may be done by fading the radio strength of the provided radio coverage area 140 or sub-area 130 and at the same time increasing the radio strength of the radio coverage area 140 or sub-area 130 provided by the further mobile robot, causing at least one user equipment 120 to perform a change of a radio attachment and/or handover. In this scenario a new mobile robot 100 is approaching the geographical position 200 of the mobile robot 100 to be replaced. When both mobile robot 100 are close to each other, the mobile robot 100 to be replaced starts to fade the own radio strength generated by the own radio base station 150. In parallel to this the new mobile robot 100 starts to increase the radio strength generated by its own radio base station 150. This causes a user equipment 120 attached to the fading radio base station 150 to handover to the new radio base station 150. The need for this handover is detected and triggered by the access network of the wireless communication network and uses the well-known procedures for handover.

In order for a user equipment 120 to complete a handover procedure correctly, it is important that the handover is started timely, so that the wireless communication network has sufficient time to prepare the handover. The handover command can be conveyed to the user equipment 120 while it is still in coverage of the source radio coverage sub-area 130. For the user equipment 120 to be able to synchronize with the target radio coverage sub-area 130 when executing the received handover command, the user equipment 120 needs to be in coverage of the target radio coverage sub-area 130.

In case of radio base station 150 mounted on mobile robots 100, coverage to both source and target radio coverage sub-area 130 may not be available at the same time or only be available for a short time. The handover needs to be prepared from the wireless communication network at the right time. Furthermore, it is important that the source access network sends the handover command to the right instance. These decisions may be based on:

Speed of source mobile robot 100, target mobile robot 100, or relative speed of both;

Movement trajectory or forecasted estimate thereof, of source mobile robot 100, target mobile robot 100, or both;

Distances between source mobile robot 100, target mobile robot 100 and a user equipment 120;

Altitude of source mobile robot 100, target mobile robot 100, or relative to each other;

Location of user equipment 120, source mobile robot 100 or target mobile robot 100;

Estimate of coverage of source mobile robot 100, target mobile robot 100, or both, e.g. based on the criteria above.

Furthermore, also user equipment 120 measurement reports can be utilized to indicate that handover is imminent. Based on the criteria listed above, the measurement report configuration of the user equipment 120 may be adapted. In a particular embodiment, handover measurement event thresholds, such as A3 threshold (measurement reports may be triggered by a so called A3 event: A neighbor cell is found to be an offset better than the current serving cell. It should be noted that there are multiple events that can trigger a measurement report), TTT (time to trigger) and CIO (cell individual offset) may be adjusted based on the criteria above. For example, in case of high relative mobile robot 100 speed, the TTT of the handover measurement event shall be low. Another example is to apply low A3 threshold or CIO for the target mobile robot 100 in this case.

In another embodiment, the user equipment 120 may apply the measures described above based on the criteria above in an autonomous way. In particular the user equipment 120 may scale/adjust the handover measurement parameters such as TTT, A3, CIO of the source or target radio coverage sub-area 130, based on observed or estimated relative speed of source mobile robot 100 and target mobile robot 100.

Moreover, a handover measurement report received from a user equipment 120 connected to the source mobile robot 100 indicating radio coverage to the target mobile robot 100 could be used, e.g. in combination with criteria above, to start a "mass handover procedure" in order to handover multiple/all user equipment 120 from the source mobile robot 100 to the target mobile robot 100. This may accelerate the handover procedure for all involved user equipment 120.

A deployed mobile robot 100 may send operational status reports periodically or on demand if the mobile robot 100 determines a critical operational status. The maintenance base 110 receiving operational status reports from the deployed may use the operational status reports to determine if a mobile robot 100 is in a critical operational status. The maintenance base 110 may also perform calculations in order to prediction whether a mobile robot 100 may reach a critical operational status before it returns to the maintenance base 110 by circular shift operation at the current trigger interval for the circular shift operation. If the maintenance base 110 determines a critical operational status, it may instruct the mobile robot 100 to return to the maintenance base 110. An operational status may comprise at least one of a maintenance need of the mobile robot 100, and recharging/refueling need of the mobile robot 100.

Figure 4:
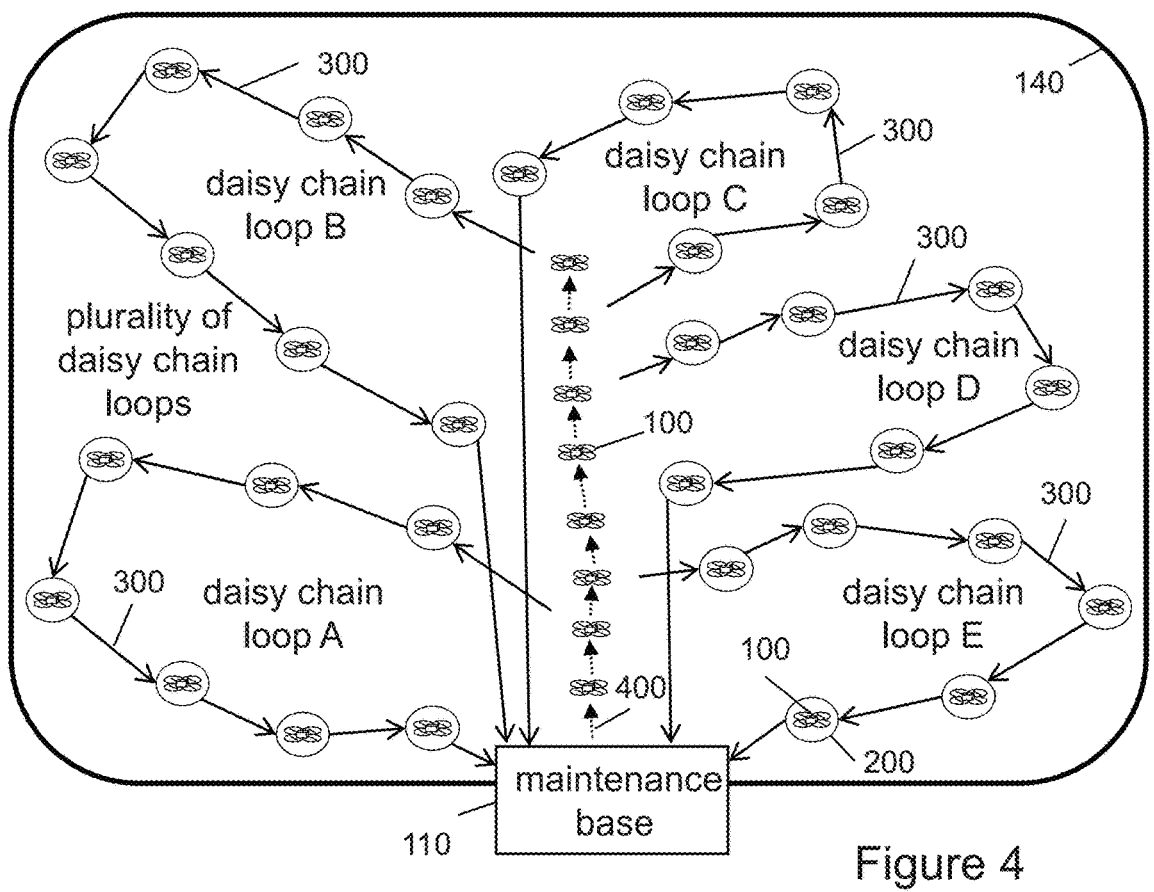
FIG. 4 shows an illustration of a plurality of daisy chain loops, all together forming a mobile coverage area, according to the invention.

Referring to FIG. 4, this figure shows an illustration of a plurality of daisy chain loops, all together forming a mobile coverage area, according to the invention.

In the previous figure a single daisy chain loop 300 was shown and the mobile robots 100 were allocated to this single daisy chain loop 300 only. This may be a viable approach if the targeted radio coverage area 140 is rather small and/or has a simple shape. If a larger region has to be covered, it may not be possible to allocate all required mobile robots 100 to a single daisy chain loop 300. Such single daisy chain loop 300 would become too long and mobile robots 100 would not be able to return in time to the maintenance base 110 for maintenance.

In an alternative embodiment a plurality of daisy chain loops 300 may be used. So the deployed mobile robots 100 may be distributed to a plurality of different daisy chain loops 300, wherein each deployed mobile robot 100 may be uniquely allocated to a single daisy chain loop 300.

FIG. 4 shows a more complex scenario where the deployed mobile robots 100, placed at various geographical positions 200, are allocated to five different daisy chain loops 300 A to E. Those daisy chain loops 300 may have non-circular shape and their shape may be adjusted to the needs of the targeted radio coverage area 140. For example the target may be to achieve radio coverage over land while leaving out sea or inland water areas. In this case the shape of a daisy chain loop 300 may follow the shape of the land. Or the coverage area shall cover important streets or highways interconnecting cities. In this case the shape of a daisy chain loop 300 may follow the path of the street, or several streets.

Each of those five different daisy chain loops 300 A to E follow the principles of the single daisy chain loop 300 as described in FIG. 3 above. So a new mobile robot 100 is fed into a daisy chain loop 300 at a circular shift operation of the daisy chain loop 300, and the last mobile robot 100 on the daisy chain loop 300 is returning to the maintenance base 110. The direction of the circular shift operation is indicated by the solid arrows in the figure. Both directions would be possible to use, also in a mixture. So some daisy chain loops 300 may shift right, other may shift left within the daisy chain loop 300.

In this embodiment with a plurality of daisy chain loops 300 the maintenance base 110 has to permanently provide new mobile robots 100 in order to feed them into the five daisy chain loops 300 at circular shift operations. For this purpose the maintenance base 110 launches continuously new mobile robots 100 on a deployment track 400, indicated by the dotted arrows starting off from the maintenance base 110. This deployment track 400 can be seen as a feeder for the different daisy chain loops 300. A new mobile robot 100 may start off from the maintenance base 110 and move along the deployment track 400. The maintenance base 110 then decides on and instructs appropriate mobile robots 100 on the deployment track 400 close to the entry geographical positions 200 into the different daisy chain loops 300 that a mobile robot 100 shall leave the deployment track 400 and enter into one of the daisy chain loops 300.

Figure 5:
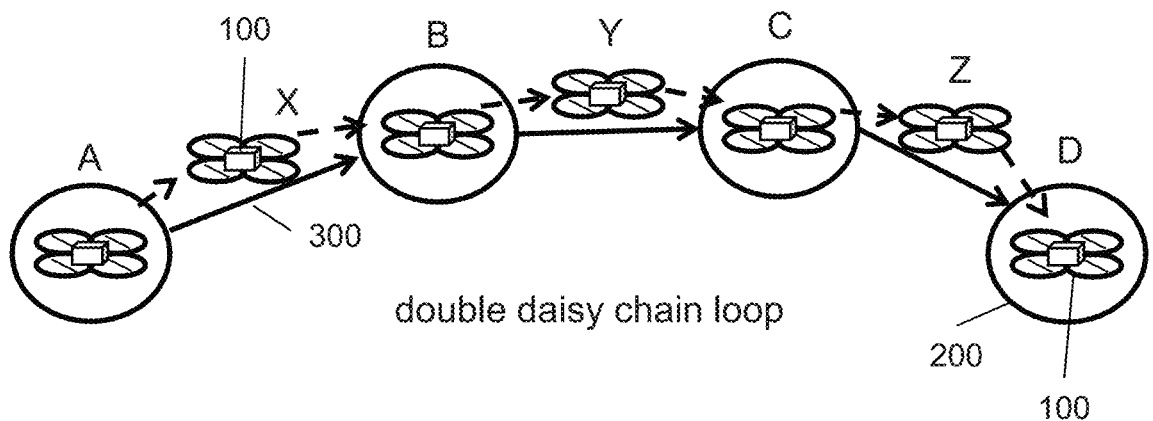
FIG. 5 shows an illustration of a double daisy chain loop, according to the invention.

Referring to FIG. 5, this figure shows an illustration of a double daisy chain loop, according to the invention.

The previous figures have shown an embodiment where mobile robots 100 are deployed to geographical positions 200. Having taken up the instructed geographical positions 200, the mobile robots 100 start to provide radio coverage sub-areas 130 making up the entire radio coverage area 140. At a circular shift operation a mobile robot 100 moves from one geographical position 200 to a next geographical position 200. In a previously described embodiment the mobile robots 100 continue to provide their radio coverage sub-area 130 while being shifted around. This has the disadvantage that the radio coverage sub-areas 130 are also moving around along the daisy chain loop 300.

In an alternative embodiment this drawback is eliminated by keeping a radio coverage sub-area 130 always tied to a geographical position 200. As a consequence mobile robots 100 may have to be reconfigured for use in a new geographical position 200 while on the move from a previous geographical position 200 to the new geographical position 200. In particular the radio base stations 150 mounted on the mobile robots 100 have to be tuned to provide the radio coverage sub-area 130 of that new geographical position 200.

Since this reconfiguration may take some time and may involve downloading or exchange of configuration information, this alternative embodiment uses a concept of a double daisy chain loop as shown in FIG. 5.

The figure shows four geographical positions 200 A to D, on each of these geographical positions 200 a mobile robot 100 is deployed providing the radio coverage sub-area 130 of the geographical positions 200 A to D. The geographical positions 200 A to D are allocated to a daisy chain loop 300 that chains up the deployed mobile robots 100.

In-between the geographical positions 200 A and B, B and C, and C and D, spare mobile robots 100 are positioned on a parallel daisy chain loop, here named as X, Y, and Z. These in-between mobile robots 100 do not generate any radio coverage sub-area 130, but their mounted radio base stations 150 are inactivated and are being re-configured while being located at this in-between position.

In a circular shift operation on a previously described daisy chain loop 300, mobile robot 100 A would move to geographical positions 200 B. However, in a circular shift operation done in this double daisy chain loop, mobile robot 100 A now moves into the in-between position X and goes inactive for reconfiguration. At the same time mobile robot 100 X moves into the geographical positions 200 B and starts to generate the radio coverage sub-area 130 for this geographical position 200, and so on. So all active mobile robots 100 move into in-between positions and perform reconfiguration. All mobile robots 100 on in-between positions move to geographical positions 200 and go active with their new configuration.

So one half of the mobile robots 100 is passive and reconfiguring, while the other half is active and provide radio coverage sub-area 130. Both halves can be allocated to two parallel daisy chain loops, also called double daisy chain loop. The two daisy chain loops of the double daisy chain loop may perform circular shifts in the same direction or may also perform shifts in opposite directions. In FIG. 5 this would mean that for example that mobile robots 100 X, Y, Z being allocated to a first daisy chain loop are shifting to the right, while mobile robots 100 A, B, C, D being allocated to a second daisy chain loop are shifting to the left.

Figure 6:
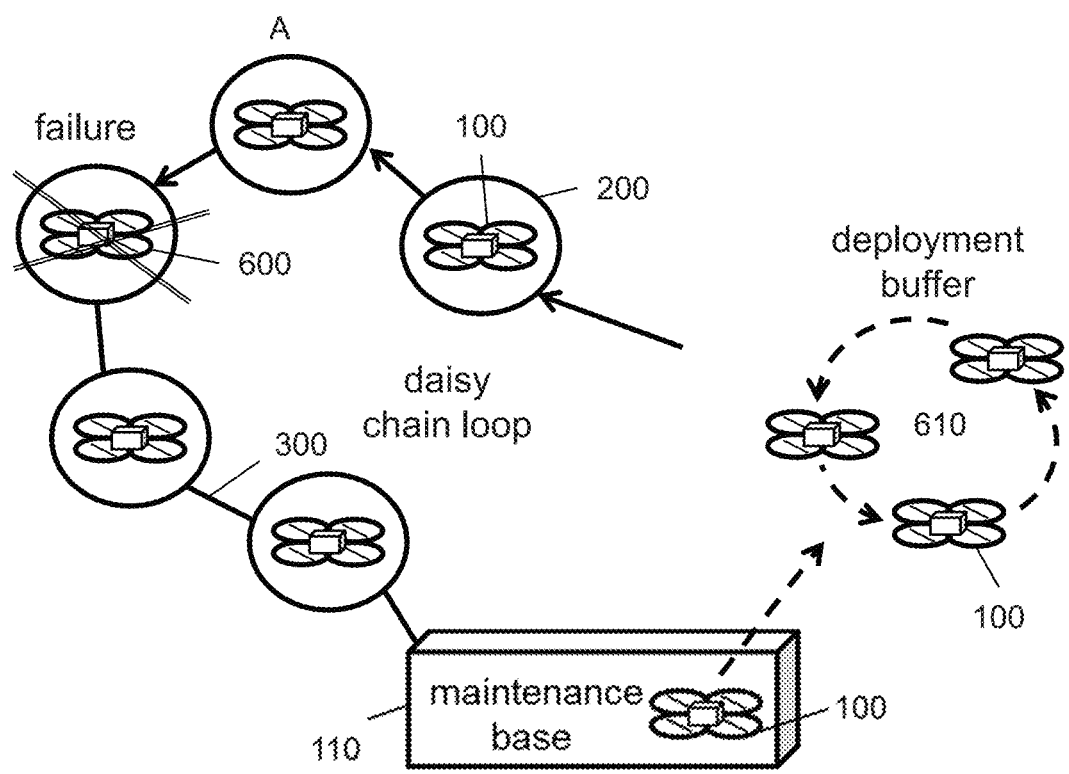
FIG. 6 shows an illustration of a replacement of a failing mobile robot from a deployment buffer, according to the invention.

Referring to FIG. 6, this figure shows an illustration of a replacement of a failing mobile robot from a deployment buffer, according to the invention.

It may happen that a deployed mobile robot 100 fails unexpectedly. It may have been destroyed at a natural disaster or by human interaction, or may fail due to a malfunction of the mobile robot 100 itself or of the mounted radio base station 150. In this case the provisioning of the radio coverage sub-area 130 of the failed mobile robot 600 is suddenly terminated. In order to maintain targeted the radio coverage area 140, the failed mobile robot 600 need to be replaced as soon as possible.

FIG. 6 shows an embodiment where a failed mobile robot 600 is replaced with minimal delay. Five mobile robots 100 are deployed to five geographical positions 200 and this figure assumes that the middle mobile robot 600 has failed. The five mobile robots 100 are allocated to a daisy chain loop 300.

The maintenance base 110 then determines the failure of the middle mobile robot 600. The maintenance base 110 may determine failure if no periodic status reports are received from a mobile robot 100 in time, by supervision with a heartbeat message or by periodic polling of the status of the mobile robots 100. Depending on the type of fault, the failed mobile robot 600 may even be capable of sending a failure indication to the maintenance base 110 before going out of service.

Having determined the failure of the middle mobile robot 600, the maintenance base 110 instructs the mobile robots 100 of the daisy chain loop 300, being placed in the daisy chain loop 300 before the failing mobile robot 600, to perform a circular shift operation. This circular shift operation causes the mobile robot 100 A next to the failed mobile robot 600 to fill in the geographical position 200 of the failed mobile robot 600. It can be assumed that the mobile robot 100 A is located close to the failed mobile robot 600, and therefore can quickly take over.

Having performed this partial circular shift operation leaves the first geographical position 200 of the daisy chain loop 300 vacant and a new mobile robot 100 needs to be deployed from the maintenance base 110. In this embodiment, the maintenance base 110 runs a deployment buffer 610 of mobile robots 100. So the maintenance base 110 has launched at least one spare mobile robot 100, which is then waiting for immediate deployment at a centrally located waiting position. For flying mobile robots this may be done by letting the mobile robot 100 circulate over the maintenance base 110 (or any other central position) in order to be available for immediate deployment at failure cases. If a mobile robot 100 is removed from the deployment buffer 610 and deployed to a daisy chain loop 300, the maintenance base 110 launches a new mobile robot 100 to re-fill the deployment buffer 610. The radio base stations 150 mounted on mobile robots 100 in the deployment buffer are still inactive and would be configured and activated at deployment.

If a geographical position 200 of a failed mobile robot 600 is not too far away, it may alternatively be possible to replace the failed mobile robot 600 directly with a new mobile robot 100 from the deployment buffer 610. In this case the replacement mobile robot 100 can be configured to the failed radio coverage sub-area 130 at that geographical position 200 while being on the move to the deployment geographical position 200.

Mobile robots 100 may circulate in the deployment buffer 610 for some time and then return to the maintenance base 110 for recharging/refueling. The maintenance base 110 may also use the deployment buffer 610 as a deployment track 400 as described in FIG. 4. However, the maintenance base 110 has to ensure that the deployment buffer 610 is always well filled with "fresh" mobile robots 100 that can immediately be used for replacement of failing mobile robots 600.

Figure 7:
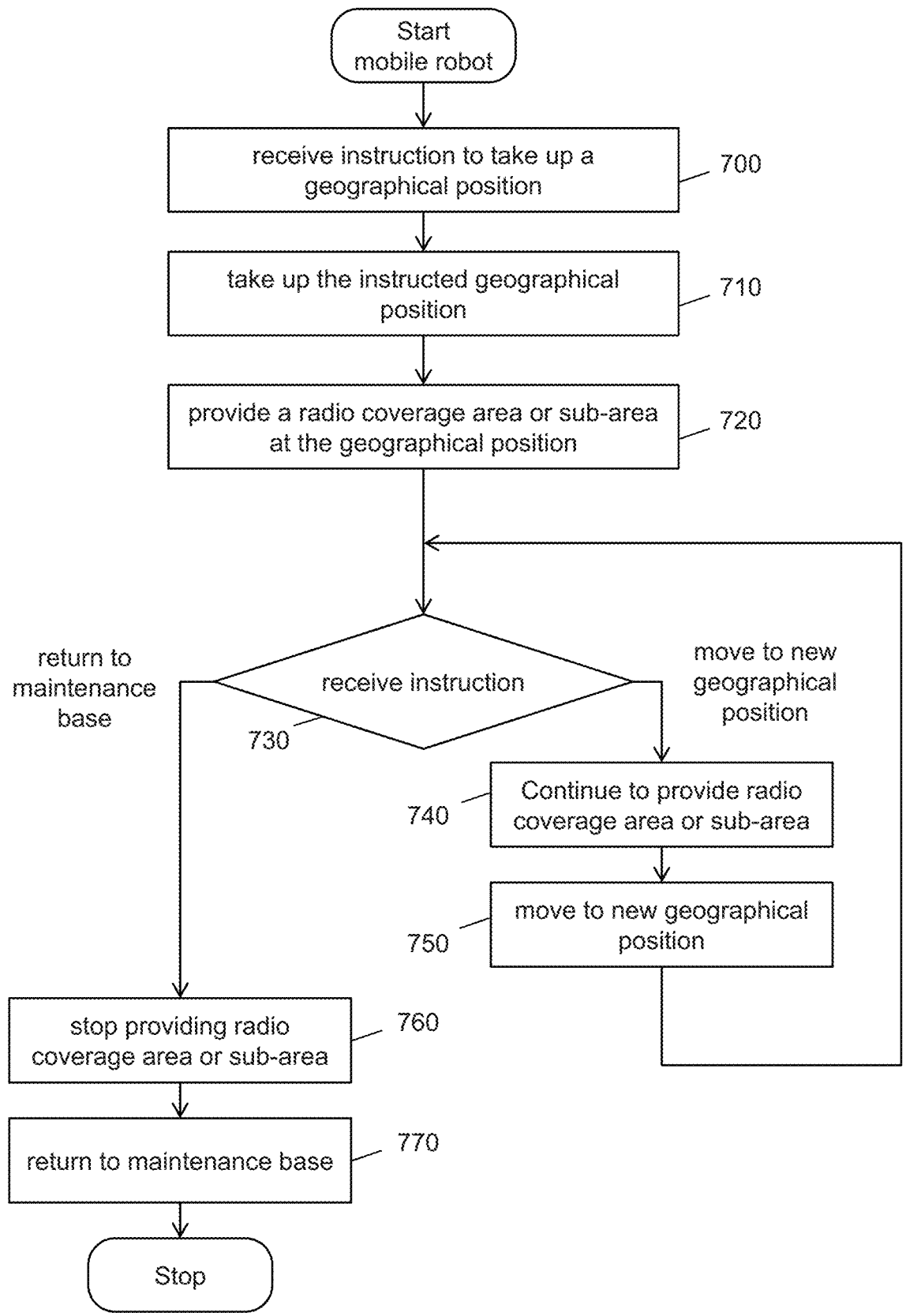
FIG. 7 shows a first flow diagram in a mobile robot, according to the invention.

Referring to FIG. 7, this figure shows a first flow diagram in a mobile robot, according to the invention. This flow describes a deployment, provisioning, returning cycle of a mobile robot 100.

The mobile robot 100 may receive in step 700 an instruction to take up a geographical position 200. This instruction may be received from the maintenance base 110 and the mobile robot 100 receiving this instruction may be placed in or close to the maintenance base 110. This may be an initial deployment of this mobile robot 100, or the mobile robot 100 may have been returning to the maintenance base 110 before, and is sent back into deployment after refueling/recharging and regular maintenance.

In step 710 the mobile robot 100 may then take up the indicated geographical position 200. The mobile robot 100 may take up the indicated geographical position 200 by moving straight from the maintenance base 110 to the indicated geographical position 200. By alternative the mobile robot 100 may take up the indicated geographical position 200 by moving along a path of the daisy chain loop 300 starting from the maintenance base 110. By alternative the mobile robot 100 may take up the indicated geographical position 200 by moving along a given path, wherein the path may be instructed by the maintenance base 110. Having reached the indicated geographical position 200, the mobile robot 100 may hover at that indicated geographical position 200, land on the ground or at an exposed position, circle around that indicated geographical position 200 or simply stay there depending on the type of mobile robot 100.

In step 720 the mobile robot 100 may provide a radio coverage sub-area 130 at the geographical position 200. The plurality of all provided radio coverage sub-areas 130 make up the entire radio coverage area 140. The mobile robot 100 uses the mounted radio base station 150 for provisioning the radio coverage sub-area 130.

In the next step the mobile robot 100 waits for further instructions, for example from the maintenance base 110. If the further instruction is a command to return to the maintenance base 110, step 760 is executed. If the further instruction is a command to move to a newly indicated geographical position 200, step 740 is executed.

Step 740 is executed if the mobile robot 100 receives an instruction to move to a new geographical position 200. In this step the mobile robot 100 may continue to provide the radio coverage sub-area 130 while moving in step 750 to the newly indicated geographical position 200. The flow then loops back and the mobile robot 100 continues in step 730 with waiting for new instructions. This flow shows an embodiment where the mobile robot 100 continues to provide the radio coverage sub-area 130 while moving new geographical position 200. Alternative embodiments are described above where the mobile robot 100 discontinues to provide the radio coverage sub-area 130, re-configures, and provides another radio coverage sub-area 130 at the target geographical position 200.

Step 760 is executed if the mobile robot 100 receives an instruction to return to the maintenance base 110. In this case the mobile robot 100 stops to provide the radio coverage sub-area 130 and returns in step 770 to the maintenance base 110. Then the flow ends. By alternative the mobile robot 100 may be instructed to return to some other collection point where mobile robots 100 are gathered.

Figure 8:
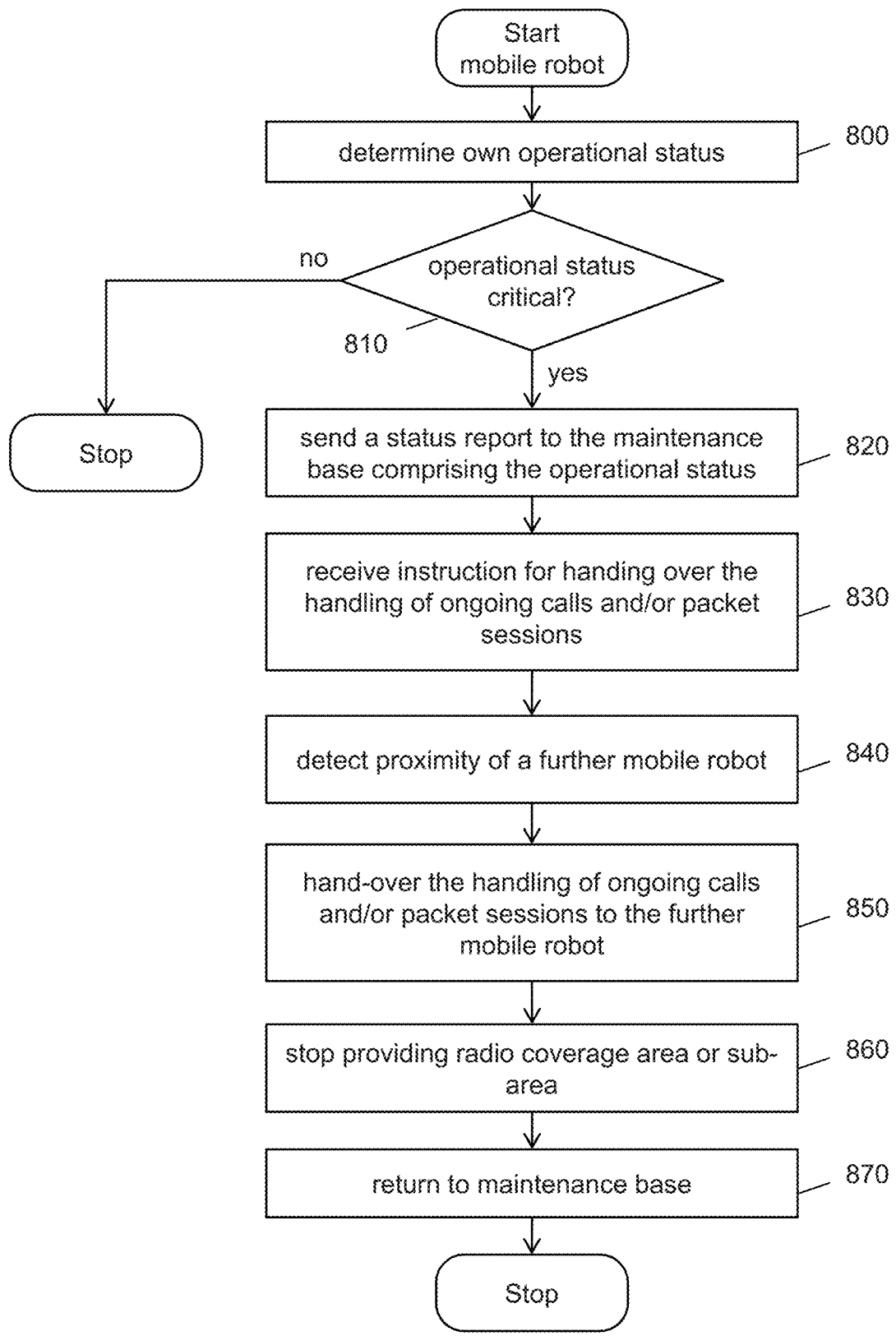
FIG. 8 shows a second flow diagram in a mobile robot, according to the invention.

Referring to FIG. 8, this figure shows a second flow diagram in a mobile robot, according to the invention. This flow describes the return of a mobile robot 100 at a critical operational status.

The flow starts when in step 800 the mobile robot 100 determines its own operational status. The mobile robot 100 may determine its own operational status in periodic intervals. By alternative or in addition, the mobile robot 100 may determine its own operational status on instruction from the maintenance base 110. By alternative or in addition, the mobile robot 100 may determine its own operational status in case the mobile robot 100 detects some malfunction.

In step 810 the mobile robot 100 analyzes the own operational status and determines whether the own operational status is critical. A critical operational status may for example be if the mobile robot 100 detects an urgent maintenance need or if recharging/refueling is required. If no critical operational status is detected, the flow may end immediately. By alternative or in addition, the mobile robot 100 may send in periodic intervals operational status reports to the maintenance base 110. Those periodic operational status reports may also indicate to the maintenance base 110 that the mobile robot 100 is operating well and no faults have been detected. So even if no critical operational status has been detected, the mobile robot 100 may send an operational status reports to the maintenance base 110 if sending of a periodic operational status report is due.

If a critical operational status is detected by the mobile robot 100, the mobile robot 100 sends immediately in step 820 a status report to the maintenance base 110 comprising the operation status of the mobile robot 100. The operation status may comprise a maintenance need of the mobile robot 100, and/or a recharging/refueling need of the mobile robot 100.

Triggered by this status report the mobile robot 100 may receive an instruction for handing over the handling of ongoing calls and/or packet sessions. In this case the mobile robot 100 shall hand-over the handling of ongoing calls and/or packet sessions in the mounted radio base station 150 to a further mobile robot 100. The mobile robot 100 has still to wait with the hand-over until a further mobile robot 100 arrives.

In step 840 the mobile robot 100 then detects the proximity of a further mobile robot 100. This further mobile robot 100 may have been instructed by the maintenance base 110 to move to the geographical position 200 of the mobile robot 100.

In step 850 the handling of ongoing calls and/or packet sessions are handed-over to the further mobile robot 100. By alternative, the mobile robot 100 may report the detection of the proximity of a further mobile robot 100 to the maintenance base 110 and as a response the maintenance base 110 may instruct the mobile robot 100 to hand-over handling of ongoing calls and/or packet sessions to the further mobile robot 100.

In step 860 the mobile robot 100 stops providing the radio coverage sub-area 130, for example by switching off the mounted radio base station 150.

In step 870 the mobile robot 100 then returns to the maintenance base 110. By alternative the mobile robot 100 may be instructed to return to some other collection point where mobile robots 100 are gathered. Then the flow ends.

Figure 9:
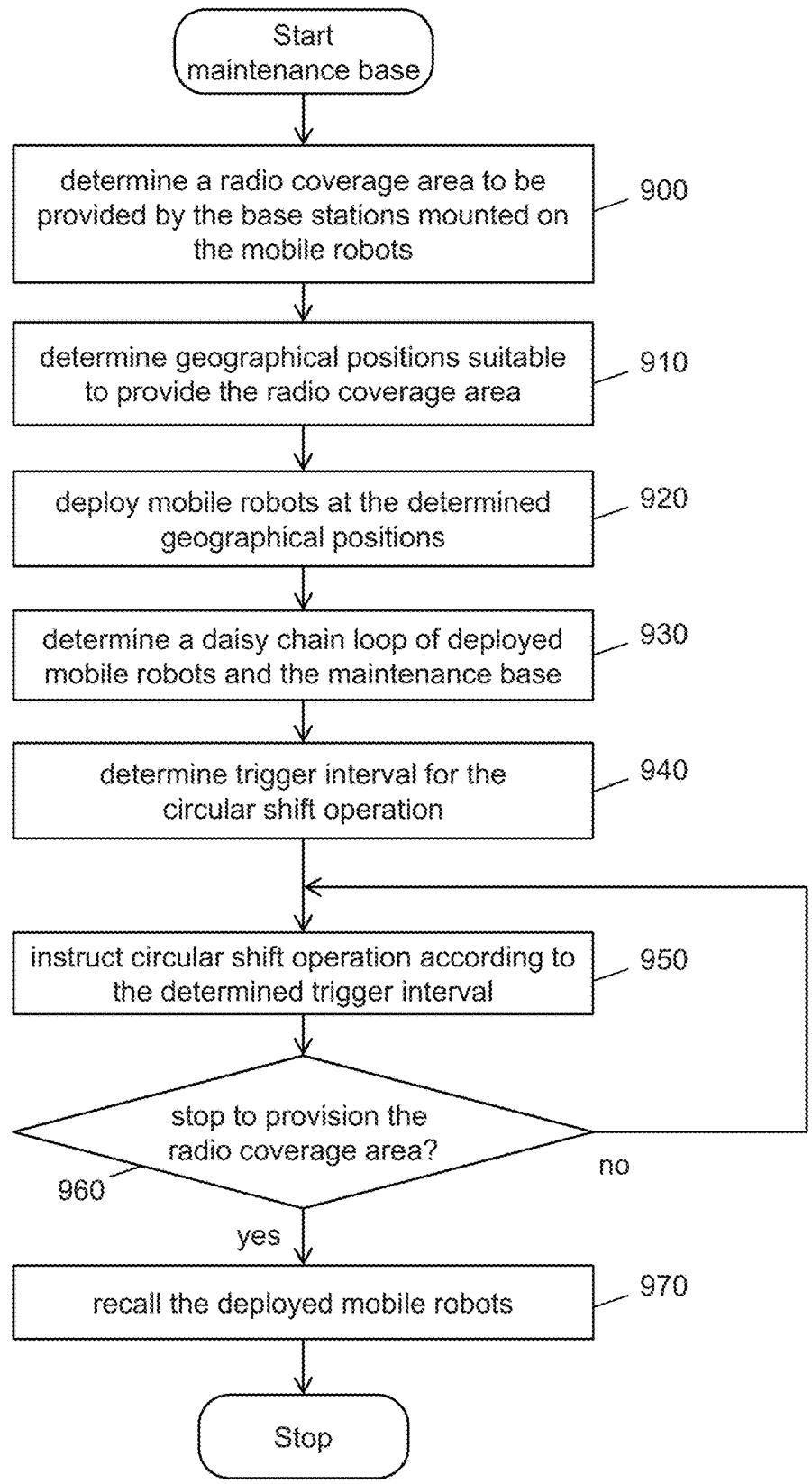
FIG. 9 shows a first flow diagram in a maintenance base, according to the invention.

Referring to FIG. 9, this figure shows a first flow diagram in a maintenance base, according to the invention. This flow describes a full provisioning cycle of radio coverage.

The flow starts in step 900 with determination of a radio coverage area 140 to be provided by the radio base stations 150 mounted on the mobile robots 100. The targeted radio coverage area 140 may have been supplied by an operation and maintenance center of the wireless communication network.

The maintenance base 110 may operate stand-alone or may be connected to or associated with for example an operation and maintenance center of the wireless communication network. In this case the maintenance base 110 may receive input from the wireless communication network on the targeted radio coverage area 140, so for example a coverage range, a coverage shape, or a capacity demand at specific geographical positions. The maintenance base 110 may also report back to the wireless communication network on the status of the provided radio coverage area 140.

Having determined the targeted radio coverage area 140, the maintenance base 110 determines in step 910 geographical position 200 suitable for providing the targeted radio coverage area 140. The targeted radio coverage area 140 is made up by a plurality of radio coverage sub-areas 130 provided by radio base stations 150 mounted on mobile robots 100. So the maintenance base 110 determines geographical position 200 such that if mobile robots 100 are placed there, the plurality of radio coverage sub-areas 130 make up the targeted radio coverage area 140. For the determination the maintenance base 110 may consider the capabilities of the mobile robots 100 and their mounted radio base stations 150. Some mobile robots 100 may be have a stronger radio base station 150 mounted, capable of generating larger radio coverage sub-areas 130, or specific shaped radio coverage sub-areas 130, or even multiple radio coverage sub-areas 130 of smaller size.

In step 920 the maintenance base 110 deploys mobile robots 100 at the determined geographical position 200 suitable for providing the targeted radio coverage area 140. The maintenance base 110 may do this deployment of mobile robots 100 by instructing each mobile robot 100 to take up an instructed geographical position 200.

In step 930 the maintenance base 110 determines a daisy chain loop 300 of deployed mobile robots 100 and the maintenance base 110. The daisy chain loop 300 consists of deployed mobile robots 100, wherein the maintenance base 110 is allocated to the daisy chain loop 300 as an entry/exit element.

The number of daisy chain loop 300 elements may be determined by taking movability of the mobile robots 100 into account. Movability of the mobile robots 100 may be related to at least one of, a moving speed, a reaching range, a regular maintenance interval and a recharging/refueling interval. The number of daisy chain loop 300 elements may also be related to at least one of: a size of the radio coverage area 140 generated by the radio base stations 150 mounted on mobile robots 100, a shape of the coverage area of the wireless communication network, a capacity of the coverage area of the wireless communication network, and a maximum payload of the mobile robots 100.

By alternative, step 930 may be executed before step 920, so first the daisy chain loop 300 is determined and then deployment of the mobile robots 100 is done.

The maintenance base 110 may also determine multiple daisy chain loops 300, all of them having the maintenance base 110 allocated as an entry/exit element.

In step 940 the maintenance base 110 determines a trigger interval for a circular shift operation within the daisy chain loop 300. In addition to the number of daisy chain loop 300 elements, a further criterion for the time until a deployed mobile robot 100 returns to the maintenance base 110 may be at what interval the circular shift operation is triggered. If the circular shift operation is triggered at short intervals the mobile robots 100 will return sooner to the maintenance base 110. So by adjusting the trigger interval of the circular shift operation a timely return of the mobile robots 100 can be achieved.

In step 950 a circular shift operation is triggered within the daisy chain loop 300, based on the determined periodical trigger interval. For this the maintenance base 110 instructs each mobile robot 100 of the daisy chain loop 300 to move to a new geographical position 200. This instruction may be sent out to all mobile robots 100 of the daisy chain loop 300 at the same time, or starting with the last mobile robot 100 of the daisy chain loop 300 first. So the last mobile robot 100 is instructed to return to the maintenance base 110. The last but one mobile robot 100 is instructed to move to the now vacant last position of the daisy chain loop 300. This shift is continued until the first mobile robot 100 moves to the second position, leaving the first position vacant. The maintenance base 110 finally instructs a new mobile robot 100 to take up the vacant first position of the daisy chain loop 300.

In step 960 the maintenance base 110 checks if the provisioning of the radio coverage area 140 is to be stopped. If this is not the case, the flow is looping back to step 950. The provisioning of the radio coverage area 140 may be stopped on instruction of a operation and maintenance center, or may be stopped by the maintenance base 110 based on usage time, targeted time of the day, usage information, lack of working mobile robots 100 or other reasons. The provisioning of the radio coverage area 140 may also be stopped only partly.

If the provisioning of the radio coverage area 140 is to be stopped in step 970 the maintenance base 110 recalls the deployed mobile robots 100 to return to the maintenance base 110 or to return to some other collection point where mobile robots 100 are gathered. Then the flow ends.

Figure 10:
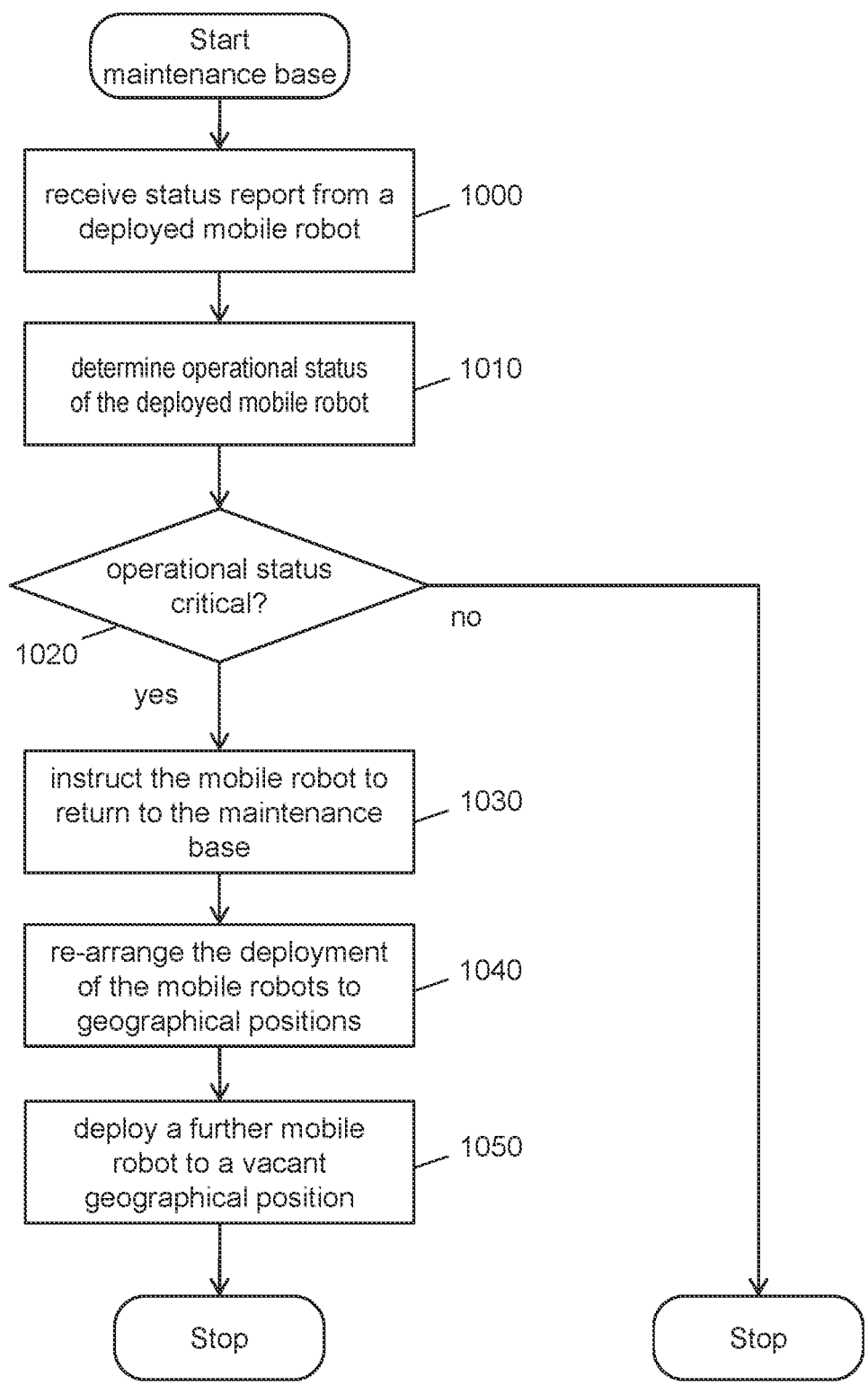
FIG. 10 shows a second flow diagram in a maintenance base, according to the invention.

Referring to FIG. 10, this figure shows a second flow diagram in a maintenance base, according to the invention. This flow describes the handling of status reports and maintaining of the targeted radio coverage area 140.

In step 1000 the maintenance base 110 receives a status report from a deployed mobile robot 100. The maintenance base 110 may receive periodic status reports from deployed mobile robots 100, or the maintenance base 110 may receive status reports from deployed mobile robots 100 having determined a critical operational status.

In step 1010 the maintenance base 110 determines the operational status of the deployed mobile robot 100 sending the status report. The operational status may comprise information such as a maintenance need of the mobile robot 100, or a recharging/refueling need of the mobile robot 100.

In step 1020 the maintenance base 110 determines whether the mobile robot 100 is in a critical operational status. A critical operational status may for example be if the mobile robot 100 detects an urgent maintenance need or if recharging/refueling is required. If the maintenance base 110 determines no critical operational status of the sending mobile robot 100, the flow ends immediately. Alternatively the maintenance base 110 may log the content of the status report for statistical and/or performance optimization purposes.

If the maintenance base 110 determines the operational status of the sending mobile robot 100 to be critical, step 1030 is performed. In this step the maintenance base 110 instructs the mobile robot 100 to return to the maintenance base 110. However, the operational status of the sending mobile robot 100 may be very critical and the mobile robot 100 may not be capable anymore to return to the maintenance base 110.

In the next step 1040 the maintenance base 110 re-arranges the deployment of the mobile robots 100 to geographical positions 200. The maintenance base 110 may perform this re-arrangement by instructing the remaining deployed mobile robots 100 to perform a circular shift operation within the daisy chain loop 300. The maintenance base 110 may also instruct only a part of the deployed mobile robots 100 to perform a circular shift operation (partly circular shift operation) and by that close a vacant position within the daisy chain loop 300.

In step 1050 the maintenance base 110 deploys a further mobile robot 100 to a vacant geographical position 200. By alternative the step 1050 may executed without previous re-arrangement in step 1040. Then the flow ends.

Figure 11:
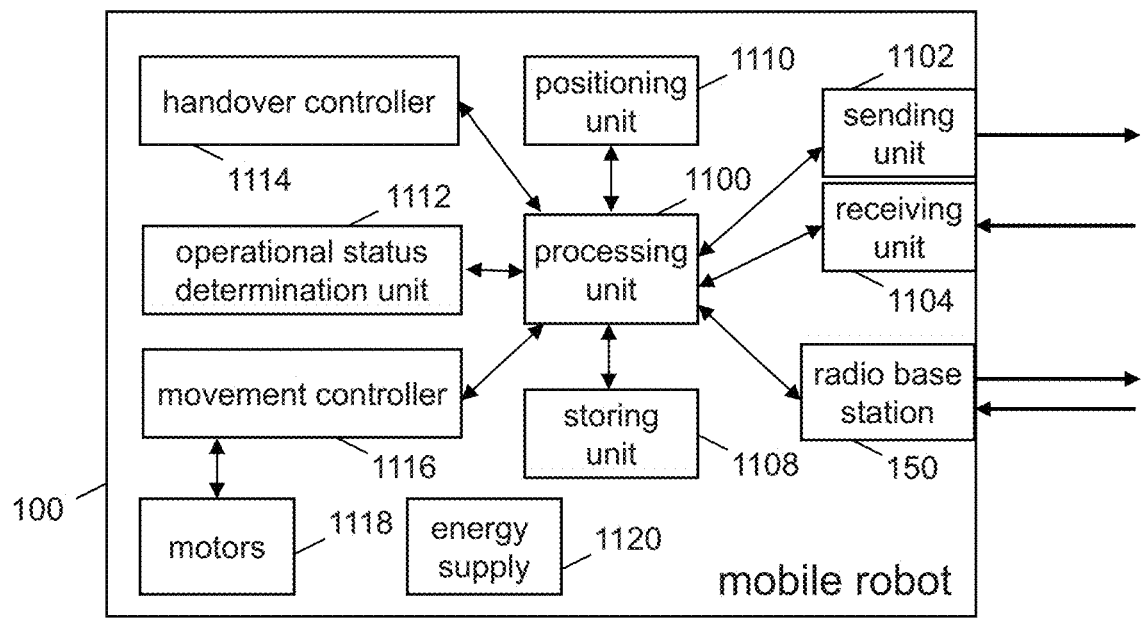
FIG. 11 shows a block diagram illustrating a mobile robot, according to the invention.

Referring to FIG. 11, this figure shows a block diagram illustrating a mobile robot, according to the invention. The illustrated entity may correspond to the mobile robot 100. The mobile robot 100 may be adapted to perform one or more steps of the above described method shown in FIG. 7 or FIG. 8.

The mobile robot 100 may comprise a number of functional units, which are described in further detail below and which are adapted to perform respective method steps.

A processing unit 1100 of the mobile robot 100 may be adapted to process instructions received from a maintenance base 110, to determine an own operational status to be critical, to determine a condition that a return to the maintenance base 110 is required, to initiate handing over handling of calls and/or packet sessions ongoing in the radio base station 150 of the mobile robot 100 to a further mobile robot, or to control the mounted radio base station 150. In a practical implementation the processing unit 1100 may be one processor taking care of all the above functions, or may also be distributed over more than one processor, wherein the functions are distributed over the available processors.

The mobile robot 100 may further comprise a sending unit 1102 and a receiving unit 1104 via which the mobile robot 100 can communicate with other entities of the wireless communication network such as the radio access network of the wireless communication network, the maintenance base 110, or other mobile robots 100. The sending unit 1102 may send out signaling messages composed by the processing unit 1100. The receiving unit 1104 may receive signaling messages originating from a radio access network of the wireless communication network, the maintenance base 110, or other mobile robots 100, and forward the received signaling messages to the processing unit 1100 for processing. The mobile robot 100 may comprise more than one sending unit and receiving unit for signaling capacity and redundancy reasons.

The mobile robot 100 may also comprise one or several mounted radio base stations 150. A radio base station 150 is used to generate a radio coverage sub-area 130. The radio base station 150 is used within the radio access network of the wireless communication network. The radio base station 150 interfaces the processing unit 1100 in order to receive instructions, for example for re-configuration, initiation of hand-over, fading of radio strength, or shut-down.

The mobile robot 100 may also comprise a storing unit 1108 related to operations for providing coverage of a wireless communication network. The storing unit 1108 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1108 may be used by the processing unit 1100 for storing information, for example program code.

The mobile robot 100 may also comprise a positioning unit 1110 for determination of the current position. This may for example be a Global Positioning System (GPS) receiver using satellites for positioning. The processing unit 1100 may use the positioning information in order to compare the current position with an instructed target position and using the result to steer the movement controller 1116. The processing unit 1100 may use the positioning information in order to maintain a current geographical position 200.

The mobile robot 100 may also comprise an operational status determination unit 1112 for determining the own operational status. The operational status determination unit 1112 may for example comprise sensors to measure the amount of spare fuel or spare battery power. The operational status determination unit 1112 may also have timers or usage counters to determine whether and when periodic maintenance is required. The information provided by the operational status determination unit 1112 may be used by the processing unit 1100 to determine a critical operational status.

The mobile robot 100 may also comprise a handover controller 1114 for controlling a handover of handing over handling of calls and/or packet sessions ongoing in the radio base station 150 of the mobile robot 100 to a further mobile robot. The handover controller 1114 does this by interacting with the mounted radio base station 150.

The mobile robot 100 may also comprise a movement controller 1116 for controlling the movement of the mobile robot 100. It receives positioning information from the positioning unit 1110 on the current position and receives from the processing unit 1100 information on a target position. The movement controller 1116 then steers the motors 1118 of the mobile robot 100 such that a targeted position is reached. The movement controller 1116 may also control the balance and direction of the mobile robot 100 as such and by that ensure a stable radio coverage sub-area 130 on the ground.

The mobile robot 100 may also comprise motors 1118 for movement and balance of the mobile robot 100 and/or to maintain a given geographical position 200.

The mobile robot 100 may also comprise an energy supply module 1120 used to produce electrical energy needed for the operation of the mobile robot 100 and of the radio base station 150. This energy supply module 1120 may further comprise batteries, a generator, and spare fuel.

Figure 12:
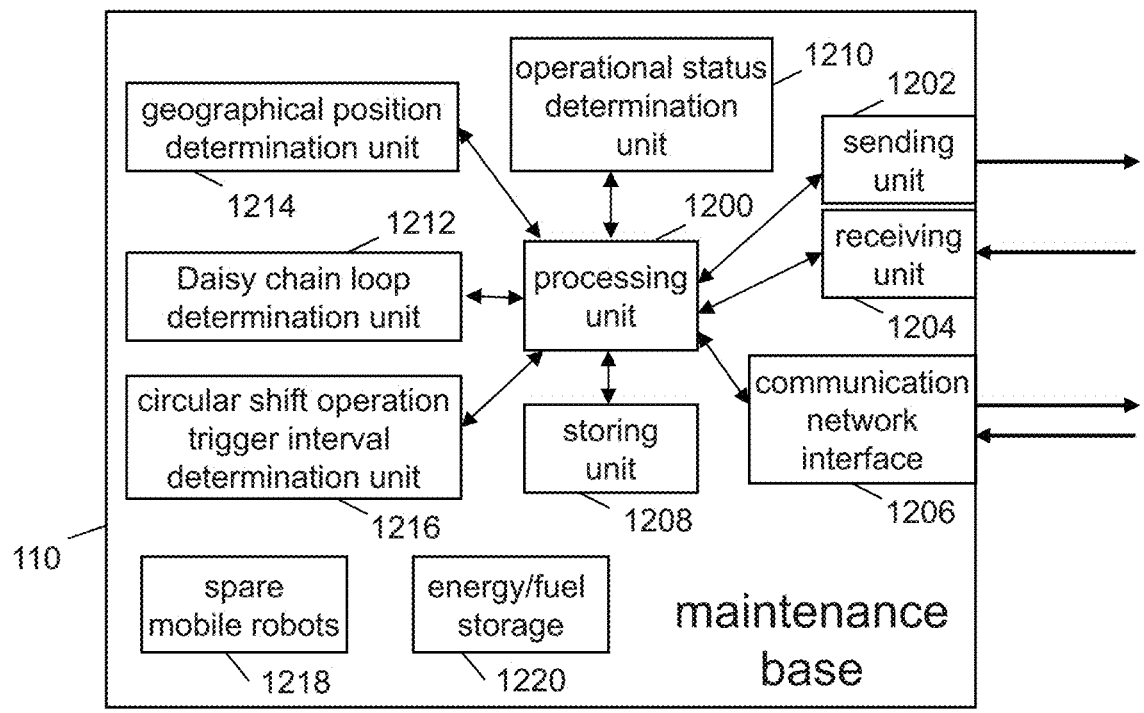
FIG. 12 shows a block diagram illustrating a maintenance base, according to the invention.

Referring to FIG. 12, this figure shows a block diagram illustrating a maintenance base, according to the invention. The illustrated entity may correspond to the maintenance base 110. The maintenance base 110 may be adapted to perform one or more steps of the above described method shown in FIG. 9 or FIG. 10.

The maintenance base 110 may comprise a number of functional units, which are described in further detail below and which are adapted to perform respective method steps.

A processing unit 1200 of the maintenance base 110 may be adapted to process status reports received from mobile robots 100, to determine a critical operational status of a mobile robots 100, to trigger a circular shift operation within a daisy chain loop 300, to determine geographical positions 200 for mobile robots 100, to instruct mobile robots 100 to take up a geographical positions 200, to instruct a mobile robot 100 to return to the maintenance base 110, to deploy a further mobile robot 100 to a vacant geographical position, to re-arrange the deployment of mobile robots 100 to geographical positions 200, or to determine a daisy chain loop 300 of deployed mobile robots 100 and the maintenance base 110. In a practical implementation the processing unit 1200 may be one processor taking care of all the above functions, or may also be distributed over more than one processor, wherein the functions are distributed over the available processors.

The maintenance base 110 may further comprise a sending unit 1202 and a receiving unit 1204 via which the maintenance base 110 can communicate with the mobile robots 100. The sending unit 1202 may send out signaling messages composed by the processing unit 1200. The receiving unit 1204 may receive signaling messages from other mobile robots 100, and forward the received signaling messages to the processing unit 1200 for processing. The maintenance base 110 may comprise more than one sending unit and receiving unit for signaling capacity and redundancy reasons.

The maintenance base 110 may further comprise a wireless communication network interface 1206 for connecting the radio base stations 150 mounted on mobile robots 100 to the access network of the wireless communication network. This interface is used for calls and sessions ongoing in the mounted radio base stations 150 and for performing user equipment 120 handover between mounted radio base stations 150 and between land-based radio base stations and mounted radio base stations 150. The maintenance base 110 may comprise more than one wireless communication network interface 1206 for signaling capacity and redundancy reasons.

The maintenance base 110 may also comprise a storing unit 1208 related to operations for providing coverage of a wireless communication network. The storing unit 1208 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1208 may be used by the processing unit 1200 for storing information, for example program code.

The maintenance base 110 may further comprise an operational status determination unit 1210 for determination of the status of the mobile robots 100. The operational status determination unit 1210 may receive a status report from the mobile robots 100. The operational status determination unit 1210 may also query a status from a mobile robot 100. Received status information may be stored/logged for statistical or optimization purposes. The processing unit 1200 may determine a critical operational status of a mobile robot 100 with the help of the operational status determination unit 1210.

The maintenance base 110 may further comprise a daisy chain loop determination unit 1212 for determination of one or several daisy chain loops 300. The daisy chain loop determination unit 1212 allocates deployed mobile robots 100 to daisy chain loops 300. The number of mobile robots 100 determines the time until a mobile robot 100 can return to the maintenance base 110 for maintenance, considering for example movability of the mobile robots 100. Movability may be related to a moving speed, a reaching range, a regular maintenance interval, and a recharging/refueling interval of the mobile robots 100. Further considered may be a size of the radio coverage area 140 generated by the radio base stations 150 mounted on mobile robots 100, a shape of the coverage area of the wireless communication network, a capacity of the coverage area of the wireless communication network, or a maximum payload of the mobile robots 100.

The maintenance base 110 may further comprise a geographical position determination unit 1214 for determination of the geographical positions 200 for deployed mobile robots 100 to generate the targeted radio coverage area 140. The geographical position determination unit 1214 determines the geographical positions 200 suited to provide the targeted radio coverage area 140.

The maintenance base 110 may further comprise a circular shift operation trigger interval determination unit 1216, for determination of the periodic circular shift operation trigger interval. Circular shift operations within a daisy chain loop 300 are triggered at periodic intervals, and the interval is determined in such a way that mobile robots 100 return to the maintenance base 110 by circular shift operations within the daisy chain loop 300, before the mobile robots 100 reach a critical operational status.

The maintenance base 110 may further comprise spare mobile robots 1218 for replacement of failing mobile robot 600 or for filling vacant geographical position 200 in daisy chain loops 300. This unit 1218 may also comprise spare parts for mobile robots 100 needed repairing mobile robots 100 and/or for periodic maintenance work.

The maintenance base 110 may further comprise energy/fuel storage 1220 for recharging/refueling of mobile robots 100 returning to the maintenance base 110 for periodic maintenance purposes. This module may comprise a fuel tank, batteries, power generator, and/or a connection to the public electricity grid.

According to another embodiment, a computer program is provided. The computer program may be executed by the processing units 1100 and/or 1200 of the above mentioned entities 100 and/or 110 respectively such that a method for providing coverage of a wireless communication network as described above with reference to FIGS. 7 to 10 may be carried out or be controlled. In particular, the entities 100 and/or 110 may be caused to operate in accordance with the above described method by executing the computer program.

The computer program may be embodied as computer code, for example of a computer program product. The computer program product may be stored on a computer readable medium, for example a disk or the storing unit 1108 and/or 1208 of the entities 100 and/or 110, or may be configured as downloadable information.

One or more embodiments as described above may enable at least one of the following technical effects:
Provide coverage of a mobile communication network with base stations mounted on mobile robots;
Cheap deployment of the mobile robots;
Expand the network coverage quickly where needed and/or when needed;
Expand the network capacity quickly where needed and/or when needed;
Cheap coverage of remote or distant places;
Quick removal of the coverage/capacity expansion;
Fast replacement in case of unexpected mobile robot failure;
Perform regular maintenance of deployed mobile robots without any degradation of the radio coverage range and/or capacity;
Adjusted measurement reports of user equipment for handover secure successful handover between two radio coverage sub-areas.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, implemented by a mobile robot of a plurality of mobile robots providing a radio coverage area, the method comprising:
receiving, from a maintenance base, an instruction to maintain a formation with the other mobile robots in the plurality of mobile robots such that the radio coverage area is provided;
responsive to receiving a further instruction from the maintenance base, rotating positions within the formation to maintain the radio coverage area as a further mobile robot in the formation leaves the formation and another mobile robot enters the formation.

2. The method of claim 1, wherein the formation comprises a sequence of geographical positions arranged in a daisy chain loop, and rotating positions within the formation comprises moving from one of the geographical positions to the next geographical position in the sequence.

3. The method of claim 1, wherein rotating positions within the formation comprises participating in a circular shift of the mobile robots in the formation.

4. The method of claim 1, further comprising responsive to receiving the instruction to maintain the formation with the other mobile robots, entering the formation from a deployment buffer of the maintenance base.

5. The method of claim 1, further comprising leaving the formation by moving to the maintenance base.

6. The method of claim 5, further comprising recharging or refueling at the maintenance base.

7. The method of claim 5, further comprising transmitting a status of the mobile robot to the maintenance base and receiving a reply from the maintenance base in response, wherein moving to the maintenance base is responsive to an additional instruction received in the reply.

8. The method of claim 1, further comprising serving a sub-area of the radio coverage area to one or more radio-attached user equipment from a given position in the formation, wherein rotating positions within the formation to maintain the radio coverage area comprises:
handing over service of the sub-area to a succeeding mobile robot in the formation that moves to the given position; and
serving a neighboring sub-area of the radio coverage area to other user equipment from a different position in the formation, the neighboring sub-area having previously been served by a preceding mobile robot in the formation that departed from the different position.

9. The method of claim 8, wherein handing over service of the sub-area to the succeeding mobile robot comprises fading radio strength of the sub-area to trigger the one or more radio-attached user equipment to instead attach to the succeeding mobile robot.

10. The method of claim 8, wherein handing over service of the sub-area to the succeeding mobile robot is responsive to detecting a proximity of the succeeding mobile robot.

11. A method, implemented by a maintenance base controlling a plurality of mobile robots providing a radio coverage area, the method comprising:
instructing the plurality of mobile robots to position themselves into a formation from which to provide the radio coverage area;
instructing a first mobile robot of the plurality of mobile robots to leave the formation;
instructing the mobile robots other than the first mobile robot to rotate positions within the formation to maintain the radio coverage area as the first mobile robot leaves the formation and another mobile robot enters the formation.

12. The method of claim 11, wherein the formation comprises a sequence of geographical positions arranged in a daisy chain loop, and instructing the mobile robots other than the first mobile robot to rotate positions within the formation comprises instructing each of the mobile robots other than the first mobile robot to move from a respective geographical position to the next geographical position in the sequence.

13. The method of claim 11, wherein instructing the mobile robots other than the first mobile robot to rotate positions within the formation comprises instructing the mobile robots other than the first mobile robot to participate in a circular shift of the formation.

14. The method of claim 11, further comprising deploying the other mobile robot entering the formation into the formation from a deployment buffer of the maintenance base.

15. The method of claim 11, further comprising instructing the first mobile robot to leave the formation by moving to the maintenance base.

16. The method of claim 15, further comprising recharging or refueling the first mobile robot at the maintenance base.

17. The method of claim 15, wherein instructing the first mobile robot to leave the formation by moving to the maintenance base is in response to receiving a status of the first mobile robot from the first mobile robot.

18. The method of claim 11, further comprising coordinating handover of sub-areas of the radio coverage area served by respective ones of the mobile robots in the formation before the rotation of positions to respective ones of the mobile robots in the formation after the rotation of positions.

19. A mobile robot of a plurality of mobile robots providing a radio coverage area, the mobile robot comprising:
radio circuitry configured to exchange signals with a maintenance base;
processing circuitry communicatively coupled to the radio circuitry and configured to:
receive, from a maintenance base via the radio circuitry, an instruction to maintain a formation with the other mobile robots in the plurality of mobile robots such that the radio coverage area is provided;
responsive to receiving a further instruction from the maintenance base via the radio circuitry, control the mobile robot to rotate positions within the formation to maintain the radio coverage area as a further mobile robot in the formation leaves the formation and another mobile robot enters the formation.

20. The mobile robot of claim 19, wherein the formation comprises a sequence of geographical positions arranged in a daisy chain loop, and to control the mobile robot to rotate positions within the formation the processing circuitry is configured to move the mobile robot from one of the geographical positions to the next geographical position in the sequence.

21. The mobile robot of claim 19, wherein to control the mobile robot to rotate positions within the formation, the processing circuitry is configured to cause the mobile robot to participate in a circular shift of the mobile robots in the formation.

22. The mobile robot of claim 19, wherein the processing circuitry is further configured to responsive to receiving the instruction to maintain the formation with the other mobile robots, control the mobile robot to enter the formation from a deployment buffer of the maintenance base.

23. The mobile robot of claim 19, wherein the processing circuitry is further configured to control the mobile robot to leave the formation by moving to the maintenance base.

24. The mobile robot of claim 19, wherein the processing circuitry is further configured to transmit, via the radio circuitry, a status of the mobile robot to the maintenance base and receive a reply from the maintenance base via the radio circuitry in response, wherein moving to the maintenance base is responsive to an additional instruction received in the reply.

25. The mobile robot of claim 19, wherein the processing circuitry is further configured to use the radio circuitry to serve a sub-area of the radio coverage area to one or more radio-attached user equipment from a given position in the formation using the radio circuitry, wherein to rotate positions within the formation to maintain the radio coverage area the processing circuitry is configured to:
hand over service of the sub-area to a succeeding mobile robot in the formation that moves to the given position; and
use the radio circuitry to serve a neighboring sub-area of the radio coverage area to other user equipment from a different position in the formation, the neighboring sub-area having previously been served by a preceding mobile robot in the formation that departed from the different position.

26. A maintenance base controlling a plurality of mobile robots providing a radio coverage area, the maintenance base comprising:

radio circuitry configured to exchange signals with the plurality of mobile robots;

processing circuitry communicatively coupled to the radio circuitry and configured to:

instruct the plurality of mobile robots, via the radio circuitry, to position themselves into a formation from which to provide the radio coverage area;

instruct a first mobile robot of the plurality of mobile robots, via the radio circuitry, to leave the formation;

instruct the mobile robots other than the first mobile robot, via the radio circuitry, to rotate positions within the formation to maintain the radio coverage area as the first mobile robot leaves the formation and another mobile robot enters the formation.

27. The maintenance base of claim 26, wherein the formation comprises a sequence of geographical positions arranged in a daisy chain loop, and to instruct the mobile robots other than the first mobile robot to rotate positions within the formation the processing circuitry is configured to instruct each of the mobile robots other than the first mobile robot, via the radio circuitry, to move from a respective geographical position to the next geographical position in the sequence.

28. The maintenance base of claim 26, wherein to instruct the mobile robots other than the first mobile robot to rotate positions within the formation the processing circuitry is configured to instruct the mobile robots other than the first mobile robot, via the radio circuitry, to participate in a circular shift of the formation.

29. The maintenance base of claim 26, wherein the processing circuitry is further configured to deploy the other mobile robot entering the formation into the formation from a deployment buffer of the maintenance base.

30. The maintenance base of claim 26, wherein the processing circuitry is further configured to instruct the first mobile robot, via the radio circuitry, to leave the formation by moving to the maintenance base.

31. The maintenance base of claim 26, wherein the processing circuitry is further configured to use the radio circuitry to coordinate handover of sub-areas of the radio coverage area served by respective ones of the mobile robots in the formation before the rotation of positions to respective ones of the mobile robots in the formation after the rotation of positions.

* * * * *

UNITED STATES PATENT AND TRADEMARK OFFICE
CERTIFICATE OF CORRECTION

PATENT NO. : 11,206,553 B2  
APPLICATION NO. : 16/822779  
DATED : December 21, 2021  
INVENTOR(S) : Djordjevic et al.

Page 1 of 1

It is certified that error appears in the above-identified patent and that said Letters Patent is hereby corrected as shown below:

On the Title Page

Item (72), under "Inventors", in Column 1, Line 3, delete "Lódz (PL)" and insert -- Łódź (PL) --, therefor.

On Page 2, item (63), under "Related U.S. Application Data", in Column 1, Line 1, delete "15/244,426," and insert -- 15/124,426, --, therefor.

In the Specification

In Column 1, Line 9, delete "2018," and insert -- 2018, now Pat. No. 10,631,175, --, therefor.

In Column 1, Line 12, delete "10/015,678" and insert -- 10,015,678 --, therefor.

Signed and Sealed this  
Twenty-fourth Day of May, 2022

Katherine Kelly Vidal  
*Director of the United States Patent and Trademark Office*